United States Patent
Kobal et al.

(10) Patent No.: US 12,446,613 B2
(45) Date of Patent: Oct. 21, 2025

(54) METHODS TO ADD MENTHOL, BOTANIC MATERIALS, AND/OR NON-BOTANIC MATERIALS TO A CARTRIDGE, AND/OR AN ELECTRONIC VAPING DEVICE INCLUDING THE CARTRIDGE

(71) Applicant: Altria Client Services LLC, Richmond, VA (US)

(72) Inventors: Gerd Kobal, Sandy Hook, VA (US); San Li, Midlothian, VA (US); Peter Lipowicz, Midlothian, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 18/354,826

(22) Filed: Jul. 19, 2023

(65) Prior Publication Data

US 2023/0354877 A1    Nov. 9, 2023

Related U.S. Application Data

(63) Continuation of application No. 16/558,999, filed on Sep. 3, 2019, now Pat. No. 12,178,234, which is a
(Continued)

(51) Int. Cl.
*A24B 15/00* (2006.01)
*A24B 15/16* (2020.01)
(Continued)

(52) U.S. Cl.
CPC .............. *A24B 15/00* (2013.01); *A24B 15/16* (2013.01); *A24B 15/167* (2016.11);
(Continued)

(58) Field of Classification Search
None
See application file for complete search history.

(56) References Cited

U.S. PATENT DOCUMENTS 1,771,366 A    7/1930   Wyss
1,968,509 A    7/1934   Tiffany
(Continued)

FOREIGN PATENT DOCUMENTS

BE          421623 A       6/1937
CA       2947135 A1       11/2015
(Continued)

OTHER PUBLICATIONS

Chinese Office Action dated Apr. 1, 2017 issued in corresponding Chinese Patent Application No. 201480016196.1 (English translation provided).
(Continued)

*Primary Examiner* — Thor S Campbell
(74) *Attorney, Agent, or Firm* — Harness, Dickey & Pierce, P.L.C.

(57) ABSTRACT

A cartridge may include a housing, a liquid supply reservoir in the housing and configured to store a pre-vapor formulation, a vaporizer, and a porous plug. The vaporizer may be in liquid communication with the liquid supply reservoir. The vaporizer may be configured to generate a vapor from heating a portion of the pre-vapor formulation. The porous plug may be connected to the housing and separated from the liquid supply reservoir. The porous plug may be permeable to the vapor. The porous plug may enclose a flavoring additive contacting a storage material. The flavoring additive may be configured to at least partially elute from the storage material or at least partially volatilize from the storage material if the vapor flows through the porous plug. An e-vaping device may include the cartridge.

15 Claims, 3 Drawing Sheets

Related U.S. Application Data continuation of application No. 15/059,791, filed on Mar. 3, 2016, now Pat. No. 10,433,580.

(51) Int. Cl.

| | |
|---|---|
| *A24B 15/167* | (2020.01) |
| *A24B 15/30* | (2006.01) |
| *A24B 15/34* | (2006.01) |
| *A24B 15/42* | (2006.01) |
| *A24F 40/10* | (2020.01) |
| *A24F 40/20* | (2020.01) |
| *A24F 40/30* | (2020.01) |
| *A24F 40/42* | (2020.01) |

(52) U.S. Cl.
CPC ............ *A24B 15/303* (2013.01); *A24B 15/34* (2013.01); *A24B 15/42* (2013.01); *A24F 40/30* (2020.01); *A24F 40/42* (2020.01); *A24F 40/10* (2020.01); *A24F 40/20* (2020.01)

(56) References Cited

U.S. PATENT DOCUMENTS

| | | |
|---|---|---|
| 2,057,353 A | 10/1936 | Whittmore, Jr. |
| 2,104,266 A | 1/1938 | McCormick |
| 2,406,275 A | 8/1946 | Wejnarth |
| 2,442,004 A | 5/1948 | Hayward-Butt |
| 2,558,127 A | 6/1951 | Downs |
| 2,642,313 A | 6/1953 | Montenier |
| 2,728,981 A | 1/1956 | Hooper |
| 2,830,597 A | 4/1958 | Kummli |
| 2,907,686 A | 10/1959 | Siegel |
| 2,971,039 A | 2/1961 | Western |
| 2,972,557 A | 2/1961 | Toulman, Jr. |
| 2,974,669 A | 3/1961 | Ellis |
| 3,062,218 A | 11/1962 | Temkovits |
| 3,200,819 A | 8/1965 | Gilbert |
| 3,255,760 A | 6/1966 | Selke et al. |
| 3,258,015 A | 6/1966 | Ellis et al. |
| 3,356,094 A | 12/1967 | Ellis et al. |
| 3,363,633 A | 1/1968 | Weber |
| 3,402,723 A | 9/1968 | Hu |
| 3,425,414 A | 2/1969 | Roche |
| 3,482,580 A | 12/1969 | Hollabaugh |
| 3,583,846 A | 6/1971 | Kimball et al. |
| 3,633,881 A | 1/1972 | Yurdin |
| 3,812,854 A | 5/1974 | Michaels et al. |
| 3,878,041 A | 4/1975 | Leitnaker et al. |
| 3,949,743 A | 4/1976 | Shanbrom |
| 4,068,672 A | 1/1978 | Guerra |
| 4,077,784 A | 3/1978 | Vayrynen |
| 4,083,372 A | 4/1978 | Boden |
| 4,131,119 A | 12/1978 | Blasutti |
| 4,141,369 A | 2/1979 | Burruss |
| 4,164,230 A | 8/1979 | Pearlman |
| 4,193,411 A | 3/1980 | Faris et al. |
| 4,219,032 A | 8/1980 | Tabatznik et al. |
| 4,246,913 A | 1/1981 | Ogden et al. |
| 4,257,389 A | 3/1981 | Texidor et al. |
| 4,259,970 A | 4/1981 | Green, Jr. |
| 4,413,641 A | 11/1983 | Dwyer, Jr. et al. |
| 4,419,302 A | 12/1983 | Nishino et al. |
| 4,462,397 A | 7/1984 | Suzuki |
| 4,629,604 A | 12/1986 | Spector |
| 4,735,217 A | 4/1988 | Gerth et al. |
| 4,765,347 A | 8/1988 | Sensabaugh, Jr. et al. |
| 4,804,002 A | 2/1989 | Herron |
| 4,846,199 A | 7/1989 | Rose |
| 4,922,901 A | 5/1990 | Brooks et al. |
| 4,945,929 A | 8/1990 | Egilmex |
| 4,945,931 A | 8/1990 | Gori |
| 4,947,874 A | 8/1990 | Brooks et al. |
| 4,947,875 A | 8/1990 | Brooks et al. |
| 4,961,727 A | 10/1990 | Beard |
| 4,981,522 A | 1/1991 | Nichols et al. |
| 4,991,606 A | 2/1991 | Serrano et al. |
| 4,993,436 A | 2/1991 | Bloom, Jr. |
| 5,016,656 A | 5/1991 | McMurtrie |
| 5,040,552 A | 8/1991 | Schleich et al. |
| 5,042,510 A | 8/1991 | Curtiss et al. |
| 5,060,671 A | 10/1991 | Counts et al. |
| 5,085,804 A | 2/1992 | Washburn |
| 5,093,894 A | 3/1992 | Deevi et al. |
| 5,095,921 A | 3/1992 | Losee et al. |
| 5,139,594 A | 8/1992 | Rabin |
| 5,144,962 A | 9/1992 | Counts et al. |
| 5,156,170 A | 10/1992 | Clearman et al. |
| 5,159,940 A | 11/1992 | Hayward et al. |
| 5,179,966 A | 1/1993 | Losee et al. |
| 5,224,498 A | 7/1993 | Deevi et al. |
| 5,228,460 A | 7/1993 | Sprinkel et al. |
| 5,235,157 A | 8/1993 | Blackburn |
| 5,249,586 A | 10/1993 | Morgan et al. |
| 5,259,062 A | 11/1993 | Pelonis |
| 5,269,327 A | 12/1993 | Counts et al. |
| 5,322,075 A | 6/1994 | Deevi et al. |
| 5,353,813 A | 10/1994 | Deevi et al. |
| 5,369,723 A | 11/1994 | Counts et al. |
| 5,388,594 A | 2/1995 | Counts et al. |
| 5,396,911 A | 3/1995 | Casey, III et al. |
| 5,404,871 A | 4/1995 | Goodman et al. |
| 5,408,574 A | 4/1995 | Deevi et al. |
| 5,498,855 A | 3/1996 | Deevi et al. |
| 5,505,214 A | 4/1996 | Collins et al. |
| 5,542,410 A | 8/1996 | Goodman et al. |
| 5,591,368 A | 1/1997 | Fleischhauer et al. |
| 5,613,504 A | 3/1997 | Collins et al. |
| 5,665,262 A | 9/1997 | Hajaligol et al. |
| 5,666,977 A | 9/1997 | Higgins et al. |
| 5,666,978 A | 9/1997 | Counts et al. |
| 5,692,095 A | 11/1997 | Young |
| 5,743,251 A | 4/1998 | Howell et al. |
| 5,797,390 A | 8/1998 | McSoley |
| 5,865,185 A | 2/1999 | Collins et al. |
| 5,878,752 A | 3/1999 | Adams et al. |
| 5,894,841 A | 4/1999 | Voges |
| 5,935,975 A | 8/1999 | Rose et al. |
| 5,970,974 A | 10/1999 | Van Der Linden et al. |
| 6,105,877 A | 8/2000 | Coffee |
| 6,155,268 A | 12/2000 | Takeuchi |
| 6,196,218 B1 | 3/2001 | Voges |
| 6,234,167 B1 | 5/2001 | Cox et al. |
| 6,386,674 B1 | 5/2002 | Corrigan, III et al. |
| 6,443,146 B1 | 9/2002 | Voges |
| 6,460,781 B1 | 10/2002 | Garcia et al. |
| 6,501,052 B2 | 12/2002 | Cox et al. |
| 6,516,796 B1 | 2/2003 | Cox et al. |
| 6,532,965 B1 | 3/2003 | Abhulimen et al. |
| 6,543,443 B1 | 4/2003 | Klimowicz et al. |
| 6,568,390 B2 | 5/2003 | Nichols et al. |
| 6,598,607 B2 | 7/2003 | Adiga et al. |
| 6,663,019 B2 | 12/2003 | Garcia et al. |
| 6,715,487 B2 | 4/2004 | Nichols et al. |
| 6,715,697 B2 | 4/2004 | Dueqroie |
| 6,772,756 B2 | 8/2004 | Shayan |
| 6,799,576 B2 | 10/2004 | Farr |
| 6,810,883 B2 | 11/2004 | Felter et al. |
| 6,830,383 B2 | 12/2004 | Huang |
| 6,854,470 B1 | 2/2005 | Pu |
| 6,886,557 B2 | 5/2005 | Childers et al. |
| 7,117,867 B2 | 10/2006 | Cox et al. |
| 7,131,599 B2 | 11/2006 | Katase |
| 7,167,641 B2 | 1/2007 | Tam et al. |
| 7,173,222 B2 | 2/2007 | Cox et al. |
| 7,195,403 B2 | 3/2007 | Oki et al. |
| 7,281,670 B2 | 10/2007 | Lakatos et al. |
| 7,445,484 B2 | 11/2008 | Wu |
| 7,458,374 B2 | 12/2008 | Hale et al. |
| D590,988 S | 4/2009 | Hon |
| D590,989 S | 4/2009 | Hon |
| D590,990 S | 4/2009 | Hon |
| D590,991 S | 4/2009 | Hon |
| 7,513,781 B2 | 4/2009 | Galauner et al. |

(56) References Cited

U.S. PATENT DOCUMENTS

| | | |
|---|---|---|
| 7,540,286 B2 | 6/2009 | Cross et al. |
| 7,614,402 B2 | 11/2009 | Gomes |
| 7,726,320 B2 | 6/2010 | Robinson et al. |
| 7,734,159 B2 | 6/2010 | Beland et al. |
| 7,780,041 B2 | 8/2010 | Albisetti |
| 7,832,410 B2 | 11/2010 | Hon |
| 7,845,359 B2 | 12/2010 | Montaser |
| 7,913,688 B2 | 3/2011 | Cross et al. |
| 7,920,777 B2 | 4/2011 | Rabin et al. |
| 7,997,280 B2 | 8/2011 | Rosenthal |
| 8,079,371 B2 | 12/2011 | Robinson et al. |
| D655,036 S | 2/2012 | Zhou |
| 8,127,772 B2 | 3/2012 | Montaser |
| 8,156,944 B2 | 4/2012 | Han |
| 8,205,622 B2 | 6/2012 | Pan |
| 8,258,192 B2 | 9/2012 | Wu et al. |
| 8,314,591 B2 | 11/2012 | Terry et al. |
| 8,320,751 B2 | 11/2012 | Porchia et al. |
| 8,349,251 B2 | 1/2013 | Woo et al. |
| 8,365,742 B2 | 2/2013 | Hon |
| 8,367,959 B2 | 2/2013 | Spertell |
| 8,371,310 B2 | 2/2013 | Brenneise |
| 8,375,957 B2 | 2/2013 | Hon |
| 8,393,331 B2 | 3/2013 | Hon |
| 8,402,976 B2 | 3/2013 | Fernando et al. |
| 8,449,766 B2 | 5/2013 | Feliers et al. |
| RE44,312 E | 6/2013 | Vieira |
| D684,311 S | 6/2013 | Liu |
| 8,459,270 B2 | 6/2013 | Coven et al. |
| 8,483,553 B2 | 7/2013 | Tollens et al. |
| 8,498,524 B2 | 7/2013 | Ruiz Ballesteros et al. |
| 8,499,766 B1 | 8/2013 | Newton |
| 8,511,318 B2 | 8/2013 | Hon |
| 8,528,569 B1 | 9/2013 | Newton |
| 8,550,068 B2 | 10/2013 | Terry et al. |
| 8,550,069 B2 | 10/2013 | Alelov |
| 8,584,670 B2 | 11/2013 | Hyde et al. |
| 8,689,804 B2 | 4/2014 | Fernando et al. |
| 8,689,805 B2 | 4/2014 | Hon |
| 8,833,364 B2 | 9/2014 | Buchberger |
| 8,869,804 B2 | 10/2014 | Mishra et al. |
| 8,915,254 B2 | 12/2014 | Monsees et al. |
| 8,944,052 B2 | 2/2015 | Osorio |
| 9,017,091 B2 | 4/2015 | Zhu et al. |
| 9,271,528 B2 | 3/2016 | Liu |
| 9,271,529 B2 | 3/2016 | Alima |
| 9,498,002 B1 | 11/2016 | Soreide |
| 9,603,386 B2 | 3/2017 | Xiang |
| 9,675,114 B2 | 6/2017 | Timmermans |
| 9,675,117 B2 | 6/2017 | Li et al. |
| 9,763,477 B2 | 9/2017 | Zhu |
| 9,808,032 B2 | 11/2017 | Yamada et al. |
| 9,877,508 B2 | 1/2018 | Kane |
| 9,888,714 B2 | 2/2018 | Cameron et al. |
| 9,974,743 B2 | 5/2018 | Rose et al. |
| 10,015,986 B2 | 7/2018 | Cadieux et al. |
| 10,306,927 B2 | 6/2019 | Rostami et al. |
| 10,368,581 B2 | 8/2019 | Rostami et al. |
| 2002/0071871 A1 | 6/2002 | Snyder et al. |
| 2002/0078948 A1 | 6/2002 | Hindle et al. |
| 2002/0079309 A1 | 6/2002 | Cox et al. |
| 2002/0086852 A1 | 7/2002 | Cantor et al. |
| 2002/0146242 A1 | 10/2002 | Vieira |
| 2002/0170566 A1 | 11/2002 | Farr |
| 2002/0179102 A1 | 12/2002 | Farr |
| 2003/0056790 A1 | 3/2003 | Nichols et al. |
| 2003/0075188 A1 | 4/2003 | Adiga et al. |
| 2003/0150451 A1 | 8/2003 | Shayan |
| 2004/0050396 A1 | 3/2004 | Squeo |
| 2004/0247301 A1 | 12/2004 | Yip et al. |
| 2005/0016550 A1 | 1/2005 | Katase |
| 2005/0150489 A1 | 7/2005 | Dunfield et al. |
| 2005/0235991 A1 | 10/2005 | Nichols et al. |
| 2005/0263618 A1 | 12/2005 | Spallek et al. |
| 2006/0054165 A1 | 3/2006 | Hughes et al. |
| 2006/0191546 A1 | 8/2006 | Takano et al. |
| 2006/0196518 A1 | 9/2006 | Hon |
| 2006/0213503 A1 | 9/2006 | Borgschulte et al. |
| 2007/0068523 A1 | 3/2007 | Fishman |
| 2007/0102013 A1 | 5/2007 | Adams et al. |
| 2007/0215168 A1 | 9/2007 | Banerjee et al. |
| 2007/0237499 A1 | 10/2007 | DeWitt et al. |
| 2007/0267031 A1 | 11/2007 | Hon |
| 2007/0267032 A1 | 11/2007 | Shan |
| 2008/0022999 A1 | 1/2008 | Belcastro et al. |
| 2008/0029084 A1 | 2/2008 | Costantino et al. |
| 2008/0138398 A1 | 6/2008 | Gonda |
| 2008/0138399 A1 | 6/2008 | Gonda |
| 2008/0230052 A1 | 9/2008 | Montaser |
| 2008/0241255 A1 | 10/2008 | Rose et al. |
| 2008/0247892 A1 | 10/2008 | Kawasumi |
| 2008/0276947 A1 | 11/2008 | Martzel |
| 2008/0299048 A1 | 12/2008 | Hale et al. |
| 2009/0056729 A1 | 3/2009 | Zawadzki et al. |
| 2009/0095287 A1 | 4/2009 | Emarlou |
| 2009/0095311 A1 | 4/2009 | Han |
| 2009/0095312 A1 | 4/2009 | Herbrich et al. |
| 2009/0126745 A1 | 5/2009 | Hon |
| 2009/0130216 A1 | 5/2009 | Cartt et al. |
| 2009/0151717 A1 | 6/2009 | Bowen et al. |
| 2009/0162294 A1 | 6/2009 | Werner |
| 2009/0188490 A1 | 7/2009 | Han |
| 2009/0230117 A1 | 9/2009 | Fernando et al. |
| 2009/0255534 A1 | 10/2009 | Paterno |
| 2009/0272379 A1 | 11/2009 | Thorens et al. |
| 2009/0283103 A1 | 11/2009 | Nielsen et al. |
| 2010/0021900 A1 | 1/2010 | Gong et al. |
| 2010/0031968 A1 | 2/2010 | Sheikh et al. |
| 2010/0083959 A1 | 4/2010 | Siller |
| 2010/0126505 A1 | 5/2010 | Rinker |
| 2010/0163063 A1 | 7/2010 | Fernando et al. |
| 2010/0200006 A1 | 8/2010 | Robinson et al. |
| 2010/0200008 A1 | 8/2010 | Taieb |
| 2010/0206317 A1 | 8/2010 | Albino et al. |
| 2010/0229881 A1 | 9/2010 | Hearn |
| 2010/0242975 A1 | 9/2010 | Hearn |
| 2010/0242976 A1 | 9/2010 | Katayama et al. |
| 2010/0266643 A1 | 10/2010 | Willett et al. |
| 2010/0307518 A1 | 12/2010 | Wang |
| 2010/0313901 A1* | 12/2010 | Fernando ............ B65D 85/1081 131/330 |
| 2011/0005535 A1 | 1/2011 | Xiu |
| 2011/0011396 A1 | 1/2011 | Fang |
| 2011/0036346 A1 | 2/2011 | Cohen et al. |
| 2011/0036363 A1 | 2/2011 | Urtsev et al. |
| 2011/0041858 A1 | 2/2011 | Montaser |
| 2011/0094523 A1 | 4/2011 | Thorens et al. |
| 2011/0120482 A1 | 5/2011 | Brenneise |
| 2011/0155153 A1 | 6/2011 | Thorens et al. |
| 2011/0168172 A1 | 7/2011 | Patton et al. |
| 2011/0209717 A1 | 9/2011 | Han |
| 2011/0226236 A1 | 9/2011 | Buchberger |
| 2011/0232654 A1 | 9/2011 | Mass |
| 2011/0245493 A1 | 10/2011 | Rabinowitz et al. |
| 2011/0265806 A1 | 11/2011 | Alarcon et al. |
| 2011/0277756 A1 | 11/2011 | Terry et al. |
| 2011/0277757 A1 | 11/2011 | Terry et al. |
| 2011/0277760 A1 | 11/2011 | Terry et al. |
| 2011/0277761 A1 | 11/2011 | Terry et al. |
| 2011/0277764 A1 | 11/2011 | Terry et al. |
| 2011/0277780 A1 | 11/2011 | Terry et al. |
| 2011/0290244 A1 | 12/2011 | Schennum |
| 2011/0303231 A1 | 12/2011 | Li et al. |
| 2011/0304282 A1 | 12/2011 | Li et al. |
| 2011/0315152 A1 | 12/2011 | Hearn et al. |
| 2012/0006342 A1 | 1/2012 | Rose et al. |
| 2012/0048266 A1 | 3/2012 | Alelov |
| 2012/0048466 A1 | 3/2012 | Eckert et al. |
| 2012/0111347 A1 | 5/2012 | Hon |
| 2012/0114809 A1 | 5/2012 | Edwards et al. |
| 2012/0118301 A1 | 5/2012 | Montaser |
| 2012/0145169 A1 | 6/2012 | Wu |
| 2012/0167906 A1 | 7/2012 | Gysland |
| 2012/0174914 A1 | 7/2012 | Pirshafiey et al. |

(56) References Cited

U.S. PATENT DOCUMENTS

| | | |
|---|---|---|
| 2012/0186594 A1 | 7/2012 | Liu |
| 2012/0199146 A1 | 8/2012 | Marangos |
| 2012/0199663 A1 | 8/2012 | Qiu |
| 2012/0207427 A1 | 8/2012 | Ito |
| 2012/0211015 A1 | 8/2012 | Li et al. |
| 2012/0227752 A1 | 9/2012 | Alelov |
| 2012/0230659 A1 | 9/2012 | Goodman et al. |
| 2012/0255567 A1 | 10/2012 | Rose et al. |
| 2012/0260927 A1 | 10/2012 | Liu |
| 2012/0285475 A1 | 11/2012 | Liu |
| 2012/0291791 A1 | 11/2012 | Pradeep |
| 2012/0312313 A1 | 12/2012 | Frija |
| 2012/0318882 A1 | 12/2012 | Abehasera |
| 2013/0014772 A1 | 1/2013 | Liu |
| 2013/0019887 A1 | 1/2013 | Liu |
| 2013/0025609 A1 | 1/2013 | Liu |
| 2013/0037041 A1 | 2/2013 | Worm et al. |
| 2013/0042865 A1* | 2/2013 | Monsees ................ A24F 40/53 |
| | | 128/203.27 |
| 2013/0056013 A1 | 3/2013 | Terry et al. |
| 2013/0074854 A1 | 3/2013 | Lipowicz |
| 2013/0152956 A1 | 6/2013 | von Borstel et al. |
| 2013/0192615 A1 | 8/2013 | Tucker et al. |
| 2013/0192616 A1 | 8/2013 | Tucker et al. |
| 2013/0192619 A1 | 8/2013 | Tucker et al. |
| 2013/0192620 A1 | 8/2013 | Tucker et al. |
| 2013/0192621 A1 | 8/2013 | Li et al. |
| 2013/0192622 A1 | 8/2013 | Tucker et al. |
| 2013/0192623 A1 | 8/2013 | Tucker et al. |
| 2013/0213418 A1 | 8/2013 | Tucker et al. |
| 2013/0213419 A1 | 8/2013 | Tucker et al. |
| 2013/0220315 A1 | 8/2013 | Conley et al. |
| 2013/0228191 A1 | 9/2013 | Newton |
| 2013/0284192 A1 | 10/2013 | Peleg et al. |
| 2013/0298905 A1 | 11/2013 | Levin et al. |
| 2013/0312778 A1 | 11/2013 | Shibuichi |
| 2013/0319407 A1 | 12/2013 | Liu |
| 2013/0319440 A1 | 12/2013 | Capuano |
| 2013/0340775 A1 | 12/2013 | Juster et al. |
| 2014/0000638 A1 | 1/2014 | Sebastian et al. |
| 2014/0014125 A1 | 1/2014 | Fernando et al. |
| 2014/0034071 A1 | 2/2014 | Levitz et al. |
| 2014/0060527 A1 | 3/2014 | Liu |
| 2014/0060556 A1 | 3/2014 | Liu |
| 2014/0081234 A1 | 3/2014 | Eggert et al. |
| 2014/0096782 A1 | 4/2014 | Ampolini et al. |
| 2014/0123989 A1* | 5/2014 | LaMothe .......... A61M 15/0003 |
| | | 131/328 |
| 2014/0153195 A1 | 6/2014 | You et al. |
| 2014/0163048 A1 | 6/2014 | Barker et al. |
| 2014/0166029 A1 | 6/2014 | Weigensberg et al. |
| 2014/0174441 A1 | 6/2014 | Seeney et al. |
| 2014/0190496 A1 | 7/2014 | Wensley et al. |
| 2014/0202474 A1 | 7/2014 | Peleg et al. |
| 2014/0209105 A1 | 7/2014 | Sears et al. |
| 2014/0224245 A1 | 8/2014 | Alelov |
| 2014/0246035 A1 | 9/2014 | Minskoff et al. |
| 2014/0261486 A1 | 9/2014 | Potter et al. |
| 2014/0261488 A1 | 9/2014 | Tucker |
| 2014/0261492 A1 | 9/2014 | Kane et al. |
| 2014/0261788 A1 | 9/2014 | Lewis et al. |
| 2014/0267488 A1 | 9/2014 | Ready et al. |
| 2014/0366898 A1 | 12/2014 | Monsees et al. |
| 2015/0020823 A1 | 1/2015 | Lipowicz et al. |
| 2015/0020833 A1 | 1/2015 | Conley et al. |
| 2015/0027454 A1 | 1/2015 | Li et al. |
| 2015/0027468 A1 | 1/2015 | Li et al. |
| 2015/0027469 A1 | 1/2015 | Tucker et al. |
| 2015/0027470 A1 | 1/2015 | Kane et al. |
| 2015/0040929 A1 | 2/2015 | Hon |
| 2015/0047662 A1 | 2/2015 | Hopps |
| 2015/0068541 A1 | 3/2015 | Sears et al. |
| 2015/0068544 A1 | 3/2015 | Moldoveanu et al. |
| 2015/0117841 A1 | 4/2015 | Brammer et al. |
| 2015/0164141 A1 | 6/2015 | Newton |
| 2015/0196059 A1 | 7/2015 | Liu |
| 2015/0257447 A1 | 9/2015 | Sullivan |
| 2015/0257448 A1* | 9/2015 | Lord .................... H05B 1/0244 |
| | | 700/90 |
| 2015/0258289 A1 | 9/2015 | Henry, Jr. et al. |
| 2015/0313275 A1 | 11/2015 | Anderson et al. |
| 2015/0313281 A1 | 11/2015 | Bonici et al. |
| 2015/0320116 A1 | 11/2015 | Bleloch et al. |
| 2015/0335070 A1 | 11/2015 | Sears et al. |
| 2015/0351456 A1 | 12/2015 | Johnson et al. |
| 2015/0359263 A1* | 12/2015 | Bellinger ................ A24F 40/53 |
| | | 392/394 |
| 2016/0007651 A1* | 1/2016 | Ampolini ................ A24F 40/65 |
| | | 131/328 |
| 2016/0021930 A1* | 1/2016 | Minskoff ................ A24F 40/51 |
| | | 392/395 |
| 2016/0106156 A1* | 4/2016 | Qiu ..................... H02J 7/00712 |
| | | 392/404 |
| 2016/0109115 A1 | 4/2016 | Lipowicz |
| 2016/0120224 A1 | 5/2016 | Mishra et al. |
| 2016/0135506 A1 | 5/2016 | Sanchez et al. |
| 2016/0174611 A1 | 6/2016 | Monsees et al. |
| 2016/0183598 A1 | 6/2016 | Tucker et al. |
| 2016/0192708 A1 | 7/2016 | DeMeritt et al. |
| 2016/0219938 A1* | 8/2016 | Mamoun ................ G05B 15/02 |
| 2016/0235123 A1 | 8/2016 | Krietzman |
| 2016/0285983 A1* | 9/2016 | Liu ........................ G16H 40/67 |
| 2016/0324216 A1 | 11/2016 | Li et al. |
| 2016/0331024 A1* | 11/2016 | Cameron ................ A24F 40/50 |
| 2016/0331026 A1* | 11/2016 | Cameron ................ A24F 40/50 |
| 2016/0331027 A1* | 11/2016 | Cameron ................ B05B 15/40 |
| 2016/0331035 A1* | 11/2016 | Cameron .................... H04M 1/21 |
| 2016/0331859 A1* | 11/2016 | Cameron ................ A24F 40/51 |
| 2016/0334119 A1 | 11/2016 | Cameron |
| 2016/0337362 A1* | 11/2016 | Cameron .......... G06Q 20/3278 |
| 2016/0338407 A1* | 11/2016 | Kerdemelidis .......... A24F 40/60 |
| 2016/0345628 A1* | 12/2016 | Sabet .................... H04M 1/21 |
| 2016/0360786 A1* | 12/2016 | Bellinger ................ A24F 40/46 |
| 2016/0363917 A1* | 12/2016 | Blackley .............. G06F 3/0488 |
| 2016/0374401 A1* | 12/2016 | Liu ........................ A24F 40/50 |
| | | 131/328 |
| 2017/0027232 A1 | 2/2017 | Scheck et al. |
| 2017/0042230 A1* | 2/2017 | Cameron ................ A24F 40/60 |
| 2017/0042231 A1* | 2/2017 | Cameron ................ A24F 40/65 |
| 2017/0042251 A1 | 2/2017 | Yamada et al. |
| 2017/0045994 A1* | 2/2017 | Murison ................ A61M 15/06 |
| 2017/0046357 A1* | 2/2017 | Cameron ................ A24F 40/30 |
| 2017/0046738 A1* | 2/2017 | Cameron ................ A24F 40/65 |
| 2017/0055588 A1* | 3/2017 | Cameron ................ A61M 15/06 |
| 2017/0064999 A1* | 3/2017 | Perez .................... H05B 1/0244 |
| 2017/0079327 A1* | 3/2017 | Wu ........................... H02J 7/007 |
| 2017/0079329 A1* | 3/2017 | Zitzke .................... H05B 1/0225 |
| 2017/0086496 A1* | 3/2017 | Cameron .................... B25F 1/04 |
| 2017/0086497 A1* | 3/2017 | Cameron .............. H05B 1/0244 |
| 2017/0086500 A1 | 3/2017 | Li et al. |
| 2017/0086503 A1* | 3/2017 | Cameron ................ A24F 40/40 |
| 2017/0086504 A1* | 3/2017 | Cameron ................ A24F 40/48 |
| 2017/0086505 A1* | 3/2017 | Cameron .......... H01L 29/78693 |
| 2017/0086507 A1* | 3/2017 | Rado ........................ H05B 3/44 |
| 2017/0091490 A1* | 3/2017 | Cameron ................ G06F 21/84 |
| 2017/0092106 A1* | 3/2017 | Cameron ................ A24F 40/65 |
| 2017/0093960 A1* | 3/2017 | Cameron ................ H04W 4/80 |
| 2017/0093981 A1* | 3/2017 | Cameron ................ A24F 40/65 |
| 2017/0109877 A1 | 4/2017 | Peleg et al. |
| 2017/0112197 A1 | 4/2017 | Li et al. |
| 2017/0119058 A1* | 5/2017 | Cameron ................ A24B 15/167 |
| 2017/0127727 A1* | 5/2017 | Davidson .......... A61M 15/0051 |
| 2017/0135400 A1* | 5/2017 | Liu ........................ A24F 40/53 |
| 2017/0135407 A1* | 5/2017 | Cameron ................ A24F 40/60 |
| 2017/0135408 A1* | 5/2017 | Cameron ................ A24F 40/51 |
| 2017/0135409 A1* | 5/2017 | Cameron ................ A24F 1/02 |
| 2017/0135410 A1* | 5/2017 | Cameron ................ H05B 3/12 |
| 2017/0135411 A1* | 5/2017 | Cameron ................ A24F 40/50 |
| 2017/0135412 A1* | 5/2017 | Cameron ................ A24F 40/51 |
| 2017/0136193 A1* | 5/2017 | Cameron ................ A24F 40/48 |
| 2017/0136194 A1* | 5/2017 | Cameron ................ A24F 40/05 |
| 2017/0136301 A1* | 5/2017 | Cameron ................ A24F 40/65 |
| 2017/0143917 A1* | 5/2017 | Cohen .................... A24F 40/40 |
| 2017/0150755 A1 | 6/2017 | Batista |

(56) References Cited

U.S. PATENT DOCUMENTS

| | | | |
|---|---|---|---|
| 2017/0150756 A1* | 6/2017 | Rexroad | H05B 1/0244 |
| 2017/0150758 A1 | 6/2017 | Fernando et al. | |
| 2017/0157341 A1* | 6/2017 | Pandya | A61M 11/042 |
| 2017/0181467 A1* | 6/2017 | Cameron | A63F 13/98 |
| 2017/0181474 A1* | 6/2017 | Cameron | A24B 15/167 |
| 2017/0181475 A1* | 6/2017 | Cameron | A24F 40/53 |
| 2017/0185364 A1* | 6/2017 | Cameron | G09G 5/12 |
| 2017/0196270 A1* | 7/2017 | Vick | H02J 7/0042 |
| 2017/0208867 A1* | 7/2017 | Li | G08C 17/02 |
| 2017/0215480 A1* | 8/2017 | Qiu | A24F 40/65 |
| 2017/0224020 A1* | 8/2017 | Fernando | H02J 7/0013 |
| 2017/0231280 A1* | 8/2017 | Anton | A24F 40/65 392/404 |
| 2017/0245550 A1* | 8/2017 | Freelander | A61M 15/0051 |
| 2017/0245554 A1* | 8/2017 | Perez | H05B 1/0244 |
| 2017/0251723 A1 | 9/2017 | Kobal et al. | |
| 2017/0258132 A1 | 9/2017 | Rostami et al. | |
| 2017/0258136 A1* | 9/2017 | Hawes | A24F 40/53 |
| 2017/0258142 A1* | 9/2017 | Hatton | A24F 40/50 |
| 2017/0259170 A1* | 9/2017 | Bowen | A24F 40/60 |
| 2017/0273357 A1* | 9/2017 | Barbuck | H05B 3/04 |
| 2017/0280779 A1* | 10/2017 | Qiu | G05D 23/1919 |
| 2017/0290998 A1* | 10/2017 | Poston | A61M 11/047 |
| 2017/0295844 A1* | 10/2017 | Thevenaz | A24F 40/46 |
| 2017/0303590 A1* | 10/2017 | Cameron | A24F 40/00 |
| 2017/0303593 A1* | 10/2017 | Cameron | A24F 40/60 |
| 2017/0303594 A1* | 10/2017 | Cameron | A61M 15/00 |
| 2017/0309091 A1* | 10/2017 | Cameron | G07C 5/085 |
| 2017/0332702 A1* | 11/2017 | Cameron | A24F 40/65 |
| 2017/0354180 A1 | 12/2017 | Fornarelli | |
| 2018/0000158 A1 | 1/2018 | Ewing et al. | |
| 2018/0007966 A1 | 1/2018 | Li et al. | |
| 2018/0027878 A1 | 2/2018 | Dendy et al. | |
| 2018/0092400 A1 | 4/2018 | Sahin et al. | |
| 2018/0177233 A1 | 6/2018 | Tucker et al. | |
| 2018/0235277 A1 | 8/2018 | Lin et al. | |
| 2019/0191773 A1 | 6/2019 | Alelov | |
| 2019/0200674 A1 | 7/2019 | Tucker et al. | |
| 2019/0200675 A1 | 7/2019 | Bache et al. | |
| 2019/0387796 A1 | 12/2019 | Cohen | |
| 2019/0387802 A1 | 12/2019 | Kobal et al. | |
| 2020/0000146 A1 | 1/2020 | Anderson et al. | |
| 2022/0200854 A1 | 6/2022 | Kane | |
| 2022/0256694 A1 | 8/2022 | Kambe et al. | |
| 2023/0284693 A1 | 9/2023 | Daugherty | |
| 2023/0337653 A1 | 10/2023 | Fryers et al. | |
| 2024/0373913 A1 | 11/2024 | Li et al. | |

FOREIGN PATENT DOCUMENTS

| | | |
|---|---|---|
| CH | 421786 A | 9/1966 |
| CN | 87/104459 A | 2/1988 |
| CN | 1323231 A | 11/2001 |
| CN | 2719043 Y | 8/2005 |
| CN | 2777995 Y | 5/2006 |
| CN | 101043827 A | 9/2007 |
| CN | 101084801 A | 12/2007 |
| CN | 101115408 A | 1/2008 |
| CN | 101116542 A | 2/2008 |
| CN | 201018927 Y | 2/2008 |
| CN | 201029436 Y | 3/2008 |
| CN | 201054977 Y | 5/2008 |
| CN | 201067079 Y | 6/2008 |
| CN | 201076006 Y | 6/2008 |
| CN | 201085044 Y | 7/2008 |
| CN | 101518361 A | 9/2009 |
| CN | 201379072 Y | 1/2010 |
| CN | 201709398 U | 1/2011 |
| CN | 201789924 U | 4/2011 |
| CN | 201797997 U | 4/2011 |
| CN | 102106611 A | 6/2011 |
| CN | 201860753 U | 6/2011 |
| CN | 102166044 A | 8/2011 |
| CN | 202014571 | 10/2011 |
| CN | 202014571 U | 10/2011 |
| CN | 202014572 U | 10/2011 |
| CN | 202026804 | 11/2011 |
| CN | 102333462 A | 1/2012 |
| CN | 202233005 U | 5/2012 |
| CN | 202233007 U | 5/2012 |
| CN | 102655773 A | 9/2012 |
| CN | 102905569 A | 1/2013 |
| CN | 202738816 U | 2/2013 |
| CN | 103054196 A | 4/2013 |
| CN | 202890463 U | 4/2013 |
| CN | 103271448 A | 9/2013 |
| CN | 203353683 U | 12/2013 |
| CN | 203353685 U | 12/2013 |
| CN | 203482901 U | 3/2014 |
| CN | 103844359 A | 6/2014 |
| CN | 103859609 A | 6/2014 |
| CN | 203789157 U | 8/2014 |
| CN | 104114049 A | 10/2014 |
| CN | 203897285 U | 10/2014 |
| CN | 104284606 A | 1/2015 |
| CN | 204070536 U | 1/2015 |
| CN | 104540406 A | 4/2015 |
| CN | 204259827 U | 4/2015 |
| CN | 204351068 U | 5/2015 |
| CN | 104812260 A | 7/2015 |
| CN | 104839893 A | 8/2015 |
| CN | 104872822 A | 9/2015 |
| CN | 104968225 A | 10/2015 |
| CN | 104994757 A | 10/2015 |
| CN | 105077590 A | 11/2015 |
| CN | 105163610 A | 12/2015 |
| CN | 105163611 A | 12/2015 |
| CN | 204812033 U | 12/2015 |
| CN | 204812043 U | 12/2015 |
| CN | 105286088 A | 2/2016 |
| CN | 105307520 A | 2/2016 |
| CN | 105324045 A | 2/2016 |
| CN | 105982355 A | 10/2016 |
| DE | 2653133 A1 | 5/1978 |
| DE | 3640917 A1 | 8/1988 |
| DE | 3735704 A1 | 5/1989 |
| DE | 19854009 A1 | 5/2000 |
| EA | 019736 B1 | 5/2014 |
| EP | 0893071 A1 | 7/1908 |
| EP | 0277519 A2 | 8/1988 |
| EP | 0295122 A2 | 12/1988 |
| EP | 0358002 A2 | 3/1990 |
| EP | 0358114 A2 | 3/1990 |
| EP | 0430566 A2 | 6/1991 |
| EP | 0845220 A1 | 6/1998 |
| EP | 0857431 A1 | 8/1998 |
| EP | 1989946 A | 11/2008 |
| EP | 1989946 A1 | 11/2008 |
| EP | 2022350 A1 | 2/2009 |
| EP | 2113178 A1 | 11/2009 |
| EP | 2454956 A1 | 5/2012 |
| EP | 2460424 A1 | 6/2012 |
| EP | .2481308 A1 | 8/2012 |
| EP | 2671461 A1 | 12/2013 |
| EP | 2989912 A1 | 3/2016 |
| EP | 3422875 A1 | 1/2019 |
| GB | 680815 A | 10/1952 |
| GB | 2148079 A | 5/1985 |
| GB | 2513631 A | 11/2014 |
| GB | 2524779 A | 10/2015 |
| JP | 61068061 A | 4/1986 |
| JP | H11-192702 A | 7/1999 |
| JP | 2006/320286 A | 11/2006 |
| JP | 2010-246946 A | 11/2010 |
| JP | 2012-513750 A | 6/2012 |
| JP | 2014-528717 A | 10/2014 |
| JP | 2014-528718 A | 10/2014 |
| JP | 2015-506182 A | 3/2015 |
| JP | 2015-507695 A | 3/2015 |
| JP | 2015-513970 A | 5/2015 |
| JP | 2018-019695 A | 2/2018 |
| JP | 2019510491 A | 4/2019 |
| KR | 100636287 B1 | 10/2006 |

(56) References Cited

FOREIGN PATENT DOCUMENTS

| | | |
|---|---|---|
| KR | 10-2016-0008510 A | 1/2016 |
| NL | 8201585 A | 11/1982 |
| RU | 132954 U1 | 10/2013 |
| RU | 2509516 C2 | 3/2014 |
| RU | 2013124411 A | 2/2015 |
| RU | 2013137741 A | 2/2015 |
| RU | 2014104166 A | 9/2015 |
| WO | WO-86/02528 A1 | 5/1986 |
| WO | WO-9003224 A1 | 4/1990 |
| WO | WO-95/02970 A1 | 2/1995 |
| WO | WO-97/42993 A2 | 11/1997 |
| WO | WO-00/28843 A1 | 5/2000 |
| WO | WO-03037412 A2 | 5/2003 |
| WO | WO-2004/080216 A1 | 9/2004 |
| WO | WO-2004/095955 A1 | 11/2004 |
| WO | WO-2005/053444 A1 | 6/2005 |
| WO | WO-2005/099494 A1 | 10/2005 |
| WO | WO-2007/066374 A1 | 6/2007 |
| WO | WO-2007078273 A1 | 7/2007 |
| WO | WO-2007/098337 A2 | 8/2007 |
| WO | WO-2007/131449 A1 | 11/2007 |
| WO | WO-2007/131450 A1 | 11/2007 |
| WO | WO-2007/141668 A2 | 12/2007 |
| WO | WO-2008/055423 A1 | 5/2008 |
| WO | WO-2010091593 A1 | 8/2010 |
| WO | WO-2010/107613 A1 | 9/2010 |
| WO | WO-2010/145468 A1 | 12/2010 |
| WO | WO-2011/124033 A1 | 10/2011 |
| WO | WO-2011/125058 A1 | 10/2011 |
| WO | WO-2011/146372 A2 | 11/2011 |
| WO | WO-2012/129787 A1 | 10/2012 |
| WO | WO-2012/129812 A1 | 10/2012 |
| WO | WO-2012/142293 A2 | 10/2012 |
| WO | WO-2012/174677 A1 | 12/2012 |
| WO | WO-2013/022936 A1 | 2/2013 |
| WO | WO-2013/027249 A1 | 2/2013 |
| WO | WO-2013/116558 | 8/2013 |
| WO | WO-2013116558 A1 | 8/2013 |
| WO | WO-2013/152873 A1 | 10/2013 |
| WO | WO-2014/004648 A1 | 1/2014 |
| WO | WO-2014/032275 A1 | 3/2014 |
| WO | WO-2014/110119 A1 | 7/2014 |
| WO | WO-2014/110750 A1 | 7/2014 |
| WO | WO-2014/151040 A2 | 9/2014 |
| WO | WO-2014/187770 A2 | 11/2014 |
| WO | WO-2015/040180 A2 | 3/2015 |
| WO | WO-2015/046385 A1 | 4/2015 |
| WO | WO-2015/079197 A1 | 6/2015 |
| WO | WO-2015/112750 A1 | 7/2015 |
| WO | WO-2015/138560 A1 | 9/2015 |
| WO | WO-2015150699 A1 | 10/2015 |
| WO | WO-2015179388 A1 | 11/2015 |
| WO | WO-2016/005601 A1 | 1/2016 |
| WO | WO-2016005602 A1 | 1/2016 |
| WO | WO-2016015246 A1 | 2/2016 |
| WO | WO-2016183573 A1 | 11/2016 |
| WO | WO-2017/149152 A1 | 9/2017 |

OTHER PUBLICATIONS

U.S. Office Action dated Jun. 20, 2016 issued in co-pending U.S. Appl. No. 14/199,365.
Lee, et al. "Technique for aerosol generation with controllable micrometer size distribution," Chemosphere, vol. 73, pp. 760-767 (2008).
Moroccan Notification of Preliminary Search Report with Opinion on Patentability on Application No. 38386 dated Dec. 23, 2015.
International Search Report dated Jul. 15, 2014 issued in International Application No. PCT/US2014/0022330.
International Search Report and Written Opinion for PCT/US2013/027424 dated Apr. 25, 2013.
International Preliminary Report on Patentability for PCT/US2013/027424 dated Sep. 4, 2014.
International Search Report and Written Opinion dated Jun. 8, 2017 issued in International Application No. PCT/EP2017/055472.
International Search Report and Written Opinion dated Jun. 13, 2017 issued in International Application No. PCT/EP2017/055725.
International Search Report and Written Opinion dated Jun. 21, 2017 issued in International Application No. PCT/EP2017/055733.
International Search Report and Written Opinion dated Jun. 19, 2017 issued in International Application No. PCT/EP2017/055100.
International Search Report and Written Opinion dated May 10, 2017 issued in International Application No. PCT/EP2017/055098.
International Search Report and Written Opinion dated Jul. 14, 2017 issued in International Application No. PCT/EP2017/055098.
Russian Office Action dated Jul. 11, 2017 issued in corresponding Russian Application No. 2015144179.
U.S. Office Action dated Mar. 21, 2018 issued in copending U.S. Appl. No. 15/059,790.
U.S. Office Action dated Mar. 19, 2018 issued in copending U.S. Appl. No. 15/067,990.
U.S. Office Action dated Apr. 24, 2018 issued in co-pending U.S. Appl. No. 15/063,900.
U.S. Office Action dated Jun. 29, 2018 issued in copending U.S. Appl. No. 15/067,810.
U.S. Office Action dated Aug. 3, 2018 issued in co-pending U.S. Appl. No. 15/067,867.
U.S. Office Action dated Sep. 28, 2018 issued in co-pending U.S. Appl. No. 15/059,790.
U.S. Office Action dated Nov. 16, 2018 issued in co-pending U.S. Appl. No. 15/067,990.
Lee et al., "Technique for aerosol generation with controllable micrometer size distribution," Chemosphere 73 (2008), pp. 760-767.
International Search Report and Written Opinion for PCT/US2013/022330 dated Jul. 15, 2014.
International Search Report dated Jul. 15, 2014.
Moroccan Examination Report Application No. 38386 dated Mar. 18, 2016.
Moroccan Notification of a Preliminary Search Report with Opinion on Patentability on Application No. 38386 dated Dec. 23, 2015.
Chinese Office Action dated Apr. 1, 2017 issued in corresponding Chinese Patent Application No. 201480016196.1 (with translation).
IntInternational Search Report and Written Opinion dated May 9, 2017 issued in corresponding PCT Application No. PCT/EP2017/055102.
International Search Report and Written Opinion dated Jun. 8, 2017 issued in corresponding International Application No. PCT/EP2017/055472.
International Search Report and Written Opinion dated May 24, 2017 issued in corresponding International Application No. PCT/EP2017/055734.
International Search Report and Written Opinion for PCT/EP2017/055725 dated Jun. 13, 2017.
International Search Report and Written Opinion for PCT/EP2017/055733 dated Jun. 21, 2017.
Invitation to Pay Additional Fees for PCT/EP2017/055098 dated May 10, 2017.
International Search Report and Written Opinion for PCT/EP2017/055098 dated Jul. 14, 2017.
International Search Report and Written Opinion for PCT/EP2017/055100 dated Jun. 19, 2017.
Office Action for corresponding Russian Application No. 2015144179 dated Jul. 11, 2017 and English translation thereof.
Office Action for corresponding U.S. Appl. No. 15/067,990 dated Mar. 19, 2018.
Office Action for corresponding U.S. Appl. No. 15/059,791 dated Mar. 21, 2018.
Office Action dated Mar. 21, 2018 issued in corresponging U.S. Appl. No. 15/059,790.
U.S. Office Action issued in co-pending U.S. Appl. No. 15/063,900 dated Apr. 24, 2018.
Office Action for corresponding U.S. Appl. No. 15/067,810 dated Jun. 29, 2018.
Non-Final Office Action issued Aug. 3, 2018 in U.S. Appl. No. 15/067,867.

(56) References Cited

OTHER PUBLICATIONS

Non-Final Office Action issued Sep. 28, 2018 in U.S. Appl. No. 15/059,790.
Communication Pursuant to Rule 114(2) issued Oct. 1, 2018 in European Application No. 17710247.2.
U.S. Office Action dated Nov. 9, 2018 issued in co-pending U.S. Appl. No. 15/059,791.
Lee, Y, Jeng, F and Chen, C. "Technique for aerosol generation with controllable micrometer size distribution", Chemosphere 73 (2008) 760-767.
Office Action for corresponding U.S. Appl. No. 14/199,365 dated Jun. 20, 2016.
Office Action for corresponding Chinese Application No. 201480016196.1 dated Apr. 1, 2017 and English translation thereof.
International Search Report for corresponding International Application No. PCT/EP2017/055102 dated May 9, 2017.
International Search Report and Written Opinion for corresponding International Application No. PCT/EP2017/055472 dated Jun. 8, 2017.
International Search Report and Written Opinion for corresponding International application No. PCT/EP2017/055725 dated Jun. 13, 2017.
International Search Report for corresponding International Application No. PCT/EP2017/055733 dated Jun. 21, 2017.
International Search Report for corresponding Internation Application No. PCT/EP2017/055100 and dated Jun. 19, 2017.
International Search Report for corresponding International Application No. PCT/EP2017/055098 dated Jul. 14, 2017.
Partial International Search Report for corresponding International Application No. PCT/EP2017/055098 dated May 10, 2017.
Official Action for corresponding Russian Application No. 2015144179 dated Jul. 11, 2017 and English translation thereof.
U.S. Office Action for corresponding U.S. Appl. No. 15/059,790 dated Mar. 21, 2018.
U.S. Office Action for corresponding U.S. Appl. No. 15/059,791 dated Mar. 21, 2018.
Non-Final Office Action issued Apr. 24, 2018 in U.S. Appl. No. 15/063,900.
Non-Final Office Action issued Jun. 29, 2018 in U.S. Appl. No. 15/067,810.
Non-Final Office Action for corresponding U.S. Appl. No. 15/059,790 dated Sep. 28, 2018.
U.S. Office Action dated Dec. 27, 2018 issued in co-pending U.,S. U.S. Appl. No. 15/059,746.
U.S. Office Action dated Mar. 21, 2019 issued in co-pending U.S. Appl. No. 15/059,790.
U.S. Office Action dated Apr. 5, 2019 for corresponding U.S. Appl. No. 15/067,990.
Notice of Allowance dated Apr. 23, 2019 for corresponding U.S. Appl. No. 15/059,791.
U.S. Notice of Allowance dated May 2, 2019 for corresponding U.S. Appl. No. 15/067,867.
U.S. Notice of Allowance dated May 3, 2019 for corresponding U.S. Appl. No. 15/059,746.
U.S. Notice of Allowance dated May 7, 2019 for corresponding U.S. Appl. No. 15/067,810.
U.S. Notice of Allowance dated May 16, 2019 for corresponding U.S. Appl. No. 15/063,900.
U.S. Notice of Allowance dated Aug. 14, 2019 for corresponding U.S. Appl. No. 15/059,791.
European Office Action dated Nov. 4, 2019 for corresponding European Application No. 17710247.2.
Decision to Grant a Patent dated Oct. 22, 2019 for corresponding Kazakhstan Application No. 2018/0692.1.
Kazakhstan Notice of Allowance dated Apr. 11, 2019 for corresonding Kazakhstan Application No. 2018/00693.1.
Third Party Observation dated Nov. 22, 2019 for corresponding Japanese Application No. 2018-546509.
U.S. Office Action dated Jan. 10, 2020 for corresponding U.S. Appl. No. 15/067,990.
European Third Party Observation dated Mar. 6, 2020 for corresponding European Application No. 17710242.3.
Russian Notice of Allowance dated Mar. 17, 2020 for corresponding Russian Application No. 2018134051/12(055982).
Russian Search Report dated Mar. 17, 2020 for corresponding Russian Application No. 2018134051/12(055982).
Russian Search Report dated Mar. 10, 2020 for corresponding Russian Application No. 2018135744/12(058874).
Russian Notice of Allowance and Search Report dated Apr. 27, 2020 for corresponding Russian Application No. 2018134604.
Russian Notice of Allowance and Search Report dated May 13, 2020 for corresponding Russian Application No. 2018135684.
Russian Notice of Allowance and Search Report dated May 22, 2020 for corresponding Russian Application No. 2018134598.
Extended European Search Report dated May 28, 2020 for corresponding European Application No. 20159607.9.
U.S. Notice of Allowance dated Jun. 26, 2020 for corresponding U.S. Appl. No. 15/067,990.
Russian Notice of Allowance and Search Report dated May 13, 2020 for corresponding Russian Application No. 2018134143.
Russian Office Action dated Jun. 5, 2020 for corresponding Russian Application No. 2018135744.
Russian Office Action and Search Report dated May 27, 2020 for corresponding Russian Application No. 2018133689.
U.S. Office Action dated Sep. 16, 2020 for corresponding U.S. Appl. No. 16/227,354.
Chinese Office Action and search report dated Sep. 16, 2020 for corresponding Chinese Application No. 201780016476.6 and English translation thereof.
Chinese Office Action and search report dated Sep. 15, 2020 for corresponding Chinese Application No. 201780010772.5 and English translation thereof.
Chinese Office Action and search report dated Sep. 17, 2020 for corresponding Chinese Application No. 201780011432.4 and English translation thereof.
Chinese Office Action and search report dated Sep. 25, 2020 for corresponding Chinese Application No. 201780013171.X and English translation thereof.
Chinese Office Action dated Oct. 10, 2020 for corresponding Chinese Application No. 201780012415.2, and English-language translation thereof.
Chinese Office Action dated Oct. 14, 2020 for corresponding Chinese Application No. 201780010768.9, and English-language translation thereof.
Russian Office Action dated Oct. 9, 2020 for corresponding Russian Application No. 2018135744, and English-language translation thereof.
Russian Notice of Allowance dated Nov. 25, 2020 for corresponding Russian Application No. 2018133689, and English-language translation thereof.
European Communication of a Notice of Opposition dated Dec. 4, 2020 for corresponding European Application No. 17708784.8.
U.S. Notice of Allowance dated Jan. 6, 2021 for corresponding U.S. Appl. No. 16/227,354.
Chinese Office Action dated Jan. 6, 2021 for corresponding Chinese Application No. 201780011672.4, and English-language translation thereof.
Zhu Donglai Yunnan University Press, "electronic cigarette", published Aug. 31, 2015, pp. 544-546.
Communication of a notice of opposition dated Feb. 18, 2021 for corresponding European Application No. 17710242.3.
Goniewicz, Maciej L., et al., "Nicotine Levels in Electronic Cigarettes", Jan. 2013, available online: https://academic.oup.com/ntr/article/15/1/158/1105400.
"USB Power Delivery Specification 1.0", Jul. 16, 2012, available online on Dec. 22, 2015 at http://www.usb.org/developers/powerdelivery/PD_1.0_Introduction.pdf; proof and document available at https://web.archive.org/web/20151222214237/http://www.usb.org/developers/powerdelivery/PD_1.0_Introduction.pdf; retrieved at Feb. 1, 2021.
Wikipedia: USB, Revision of Dec. 23, 2015, available online: https://wikipedia.org/w/index.php?title=USB&oldid=696458466, retrieved on Feb. 1, 2021.

(56) References Cited

OTHER PUBLICATIONS

Brief Communication—Letter from the Opponent, dated Feb. 19, 2021 for corresponding European Application No. 17710242.3.
Japanese Decision to Grant dated Mar. 11, 2021 for corresponding Japanese Application No. 2018-547284, and English-language translation thereof.
Japanese Office Action dated Feb. 22, 2021 for corresponding Japanese Application No. 2018-546509, and English-language translation thereof.
Japanese Decision to Grant dated Mar. 18, 2021 for corresponding Japanese Application No. 2018-548129, and English-language translation thereof.
Russian Decision to Grant dated Mar. 15, 2021 for corresponding Russian Application No. 2018135744, and English-language translation thereof.
Chinese Notice of Allowance dated Mar. 15, 2021 for corresponding Chinese Application No. 201780011432.4, and English-language translation thereof.
Japanese Office Action dated Mar. 11, 2021 for corresponding Japanese Application No. 2018-548067, and English-language translation thereof.
Japanese Office Action dated Apr. 12, 2021 for corresponding Japanese Application No. P2018-548009, and English-language translation thereof.
Japanese Office Action dated Apr. 1, 2021 for corresponding Japanese Application No. P2018-546494, and English-language translation thereof.
Israeli Office Action dated May 3, 2021 for corresponding Israeli Applicatioin No. 260761, and English-language translation thereof.
Chinese Office Action dated May 14, 2021 for corresponding Chinese Application No. 201780016476.6, and English-language translation thereof.
Japanese Office Action dated Apr. 1, 2021 for corresponding Japanese Application No. 2018-541284, and English-language translation thereof.
Chinese Office Action dated Jun. 3, 2021 for corresponding Chinese Application No. 201780012415.2, and English-language translation thereof.
Chinese Office Action dated Jun. 3, 2021 for corresponding Chinese Application No. 201780013171.X, and English-language translation thereof.
Chinese Office Action dated Jun. 30, 2021 for corresponding Chinese Application No. 201780010772.5, and English-language translation thereof.
Chinese Office Action dated Jul. 6, 2021 for corresponding Chinese Application No. 201780010768.9, and English-language translation thereof.
Korean Office Action dated Aug. 12, 2021 for corresponding Korean Application No. 10- 2018-7023334, and English-language translation thereof.
Korean Office Action dated Aug. 17, 2021 for corresponding Korean Application No. 10- 2018-7023797, and English-language translation thereof.
Japanese Office Action dated Aug. 23, 2021 for corresponding Japanese Application No. 2018-548067, and English-language translation thereof.
Chinese Office Action dated Aug. 26, 2021 for corresponding Chinese Application No. 201780011672.4, and English-language translation thereof.
Japanese Notice of Allowance dated Oct. 4, 2021 for corresponding Japanese Application No. 2018-541284, and English-language translation thereof.
U.S. Office Action dated Nov. 22, 2021 for corresponding U.S. Appl. No. 16/558,999.
U.S. Office Action dated Nov. 24, 2021 for corresponding U.S. Appl. No. 16/445,775.
Korean Office Action dated Nov. 10, 2021 for corresponding Korean Application No. 10-2018-7025729, and English-language translation thereof.
Japanese Office Action dated Nov. 1, 2021 for corresponding Japanese Application No. 2018-548009, and English-language translation thereof.
Korean Notice of Allowance dated Nov. 4, 2021 for corresponding Korean Application No. 10-2018-7027377, and English-language translation thereof.
Japanese Notice of Allowance dated Nov. 29, 2021 for corresponding Japanese Application No. 2018-548009, and English-language translation thereof.
Korean Office Action dated Nov. 10, 2021 for corresponding Korean Application No. 2018-7025593, and English-language translation thereof.
Korean Office Action dated Nov. 1, 2021 for corresponding Korean Application No. 10-2018-7023893 and English-language translation thereof.
European Summons to attend Oral Proceedings for corresponding European Patent No. 3426074, dated Dec. 16, 2021.
Japanese Decision to Grant for corresponding Application No. 2018-548067, dated Dec. 15, 2021 and English-language translation thereof.
Chinese Office Action for corresponding Application No. 201780010772.5, dated Dec. 2, 2021 and English-language translation thereof.
Japanese Decision to Grant for corresponding Application No. 2018-546509, dated Dec. 22, 2021 and English-Language translation thereof.
Japanese Decision to Grant for corresponding Application No. 2018-546494, dated Jan. 4, 2022, and English-Language translation thereof.
Chinese Office Action for corresponding Application No. 201780012415.2, dated Jan. 11, 2022, and English translation thereof.
U.S. Office Action dated Feb. 1, 2022, for corresponding U.S. Appl. No. 16/449,897.
Chinese Office Action for corresponding Application No. 201780016476.6, dated Jan. 7, 2022, and English translation thereof.
European Notice of Allowance for corresponding Application No. 17710246.4, dated Jan. 20, 2022.
U.S. Notice of Allowance for corresponding U.S. Appl. No. 16/445,775, dated Mar. 10, 2022.
European Brief Communication—Letter from the Opponent for corresponding Application No. 17710242.3, dated Feb. 8, 2022.
Korean Notice of Allowance for corresponding Application No. 10-2018-7023463, dated Feb. 23, 2022, with English translation included.
Korean Notice of Allowance for corresponding Application No. 10-2018-7023334, dated Mar. 25, 2022, with English translation included.
Korean Notice of Allowance for corresponding Application No. 10-2018-7023797, dated Feb. 23, 2022, with English translation included.
Brazilian Office Action for corresponding Application No. 1120180172391, dated Apr. 29, 2022, with English Translation.
Korean Office Action for corresponding Application No. 10-2018-7025593, dated May 24, 2022, with English Translation.
Korean Office Action for corresponding Application No. 10-2018-7027377, dated May 27, 2022, with English Translation.
Korean Notice of Allowance for corresponding Application No. 10-2018-7023893, dated May 25, 2022, with English translation included.
European Letter from the Opponent for corresponding Application No. 17710242.3, dated May 19, 2022.
European Letter from the Opponent for corresponding Application No. 17710242.3, dated Jun. 29, 2022.
Cambridge Dictionary—"Definition of alternate—to happen or exist one after the other repeatedly" (<https://dictionary.cambridge.org/dictionary/english/alternate>), retrieved on Jul. 15, 2021.
Dictionary.com - "Definition of alternate—to interchange repeatedly and regularly with one another in time or place" (<https://www.dictionary.com/browse/alternate>), retrieved on Jul. 14, 2021.

(56) References Cited

OTHER PUBLICATIONS

Macmillan Dictionary—"Definition of alternate—happening or coming one after another, in a regular pattern" (<https://www.macmillandictionary.com/dictionary/british/alternate 2>), retrieved Jul. 15, 2021.
Merriam-Webster—"Definition of alternate" (<https://www.merriam-webster.com/dictionary/alternate>), retrieved May 12, 2022.
Dictionary.com—"Definition of alternate" (<https://www.dictionary.com/browse/alternate>), retrieved May 12, 2022.
"Definition of common", in: Merriam-Webster, (<https://www.merriamwebster.com/dictionary/common>), retrieved on Jun. 24, 2022.
Feature analyses of the independent claims of Auxiliary Requests 1-4, dated May 12, 2022.
Korean Notice of Allowance for corresponding Application No. 10-2018-7025729, dated May 27, 2022.
U.S. Office Action dated Aug. 22, 2022 for corresponding U.S. Appl. No. 16/577,319.
U.S. Office Action dated Dec. 6, 2022 for U.S. Appl. No. 17/226,586.
U.S. Notice of Allowance for U.S. Appl. No. 16/577,319, dated Dec. 15, 2022.
Korean Notice of Allowance for corresponding Application No. 10-2018-7027377, dated Nov. 24, 2022, and English translation thereof.
European Opposition Division Decision for corresponding Application No. 17710242.3, dated Dec. 8, 2022.
Korean Notice of Allowance for corresponding Application No. 10-2018-7025593 dated Nov. 24, 2022, and English translation thereof.
U.S. Office Action dated Feb. 16, 2023 for U.S. Appl. No. 17/226,586.
Japanese Decision to Grant for corresponding Application No. 2022-014331, dated Mar. 6, 2023, and English-Language translation thereof.
Filipino Office Action for corresponding Application No. Jan. 2018/501784, dated Mar. 5, 2023.
U.S. Office Action dated Mar. 27, 2023 for U.S. Appl. No. 17/019,915.
Canadian Office Action for corresponding Application No. 3,009,955, dated Apr. 3, 2023.
U.S. Office Action dated Apr. 24, 2023 for U.S. Appl. No. 17/226,586.
Malaysian Office Action for Application No. PI2018702870, dated May 24, 2023, with English Translation.
U.S. Notice of Allowance for U.S. Appl. No. 17/226,586, dated Jun. 29, 2023.
Notice of Allowance dated Aug. 28, 2024 issued in U.S. Appl. No. 16/577,319.
Notice of Allowance dated Aug. 29, 2024 issued in U.S. Appl. No. 17/226,586.
Notice of Allowance dated Sep. 3, 2024 issued in U.S. Appl. No. 16/445,775.
Office Action dated Oct. 16, 2023 issued in related U.S. Appl. No. 17/019,915.
Office Action dated Sep. 21, 2023 issued in related Mexican patent application No. MX/A/18/010382.
Notice of Allowance dated Dec. 19, 2023 issued in related U.S. Appl. No. 16/577,319.
Notice of Allowance dated Dec. 12, 2023 issued in related U.S. Appl. No. 16/449,897.
Notice of Allowance dated Dec. 12, 2023 issued in related U.S. Appl. No. 16/558,999.
Notice of Allowance dated Dec. 12, 2023 issued in related U.S. Appl. No. 16/227,354.
Notice of Allowance dated Jan. 3, 2024 issued in related U.S. Appl. No. 16/445,775.
Canadian Office Action for Application No. 3009118, dated Jun. 28, 2023.
Office Action dated Apr. 7, 2024 issued in Chinese patent application No. 201780012415.2.
Notice of Allowance dated Jul. 22, 2024 issued in U.S. Appl. No. 15/067,990.
Notice of Allowance dated Aug. 15, 2024 issued in U.S. Appl. No. 16/558,999.
Notice of Allowance dated Sep. 18, 2024 issued in U.S. Appl. No. 15/067,990.
Board Decision dated Sep. 19, 2024 issued in Chinese Patent Application No. 201780012415.2.
Letter from the Opponent dated Dec. 21, 2023 issued in corresponding European patent No. 3426074.
Notice of Allowance dated Jan. 29, 2024 issued in corresponding U.S. Appl. No. 16/227,354.
Notice of Allowance dated Feb. 9, 2024 issued in corresponding U.S. Appl. No. 16/558,999.
Notice of Allowance dated Jan. 29, 2024 issued in corresponding U.S. Appl. No. 16/449,897.
Office Action dated Feb. 2, 2024 issued in corresponding U.S. Appl. No. 17/019,915.
Office Action dated Feb. 9, 2024 issued in corresponding U.S. Appl. No. 17/019,915.
Notice of Allowance dated Feb. 9, 2024 issued in corresponding U.S. Appl. No. 16/445,775.
Notice of Allowance dated Sep. 25, 2024 issued in U.S. Appl. No. 16/227,354.
Notice of Allowance dated Sep. 25, 2024 issued in U.S. Appl. No. 16/449,897.
Notice of Allowance dated May 24, 2024 issued in Philippines Patent Application No. 1-2018-501784.
Office Action dated Apr. 23, 2024 issued in Chinese Patent Application No. 201780016476.6.
Notice of Allowance dated Jul. 9, 2024 issued in U.S. Appl. No. 16/558,999.
Office Action dated Jul. 9, 2024 issued in U.S. Appl. No. 17/019,915.
Office Action dated Jul. 5, 2024 issued in U.S. Appl. No. 18/354,100.
Office Action dated Jan. 19, 2024 issued in Chinese Patent Application No. 201780013171.X.
Russian Office Action and Search Report dated Aug. 23, 2023 for corresponding Russian Application No. 2020115739, and English-language translation thereof.
Chinese Office Action for Application No. 201780013171.X, dated Jun. 19, 2023, with English Translation included.
Notice of Allowance Jan. 11, 2024, issued in U.S. Appl. No. 17/226,586.
Office Action dated Dec. 22, 2023 issued in Chinese patent application No. 201780016476.6.
Decision to Grant dated Jan. 17, 2024 issued in Russian patent application No. 2020115739.
Office Action dated Dec. 31, 2024 issued in U.S. Appl. No. 18/354,100.
Notice of Allowance dated Jan. 21, 2025 issued in U.S. Appl. No. 17/019,915.
Notice of Allowance dated Mar. 19, 2025 issued in U.S. Appl. No. 18/481,500.
Notice of Allowance dated Apr. 9, 2025, issued in U.S. Appl. No. 16/449,897.
Notice of Allowance dated May 20, 2025 issued in U.S. Appl. No. 16/577,319.
Notice of Allowance dated Jun. 9, 2025 issued in U.S. Appl. No. 16/449,897.
Notice of Allowance dated May 28, 2025 issued in U.S. Appl. No. 18/354,100.
Notice of Allowance dated Jun. 20, 2025 issued in U.S. Appl. No. 17/019,915.
Notice of Allowance dated Jun. 23, 2025 issued in U.S. Appl. No. 15/067,990.
Notice of Allowance dated Jun. 24, 2025 issued in U.S. Appl. No. 18/481,500.
Notice of Allowance dated Jul. 1, 2025 issued in U.S. Appl. No. 18/354,100.

* cited by examiner

METHODS TO ADD MENTHOL, BOTANIC MATERIALS, AND/OR NON-BOTANIC MATERIALS TO A CARTRIDGE, AND/OR AN ELECTRONIC VAPING DEVICE INCLUDING THE CARTRIDGE

CROSS-REFERENCE TO RELATED APPLICATIONS

This application is a continuation of U.S. application Ser. No. 16/558,999, filed on Sep. 3, 2019, which is a continuation of U.S. application Ser. No. 15/059,791, filed on Mar. 3, 2016, which U.S. non-provisional patent application relates to U.S. application Ser. No. 15/059,790 titled "FLAVOR ASSEMBLY FOR ELECTRONIC VAPING DEVICE," filed Mar. 3, 2016, the entire contents of each of which are incorporated herein by reference.

BACKGROUND

Field

The present disclosure generally relates to a cartridge for an electronic vaping device and/or more particularly to methods to introduce menthol, botanic materials, and/or non-botanic materials to a cartridge for an electronic vaping device.

Related Art

Electronic vaping devices (also referred to as e-vaping devices) may be used to vaporize a liquid material into a "vapor" in order to permit vaping by an adult vaper. The liquid material may be referred to as a pre-vapor formulation. The pre-vapor formulation may include a nicotine-containing material, a liquid (e.g., water), and a vapor former. The pre-vapor formulation may further include one or more flavoring additives. The flavoring additives may affect an adult vaper's sensory experience during vaping.

An electronic vaping device may include several elements, such as a power source and a cartridge. The power source may be a battery section. The cartridge may include a reservoir for holding the pre-vapor formulation and a heater for vaporizing the pre-vapor formulation to produce a vapor. The pre-vapor formulation in the cartridge may be consumed when the electronic vaping device generates a vapor in response to an application of negative pressure to a mouthpiece of the electronic vaping device (e.g., a puff).

As the pre-vapor formulation is consumed, the level of the pre-vapor formulation in the cartridge decreases and the respective amounts of the nicotine-containing material, liquid, vapor former, and/or flavoring additive (if present) in the pre-vapor formulation may change by different amounts. When the pre-vapor formulation in the cartridge is consumed below a threshold level, the cartridge may be replaced with a new cartridge that contains a reservoir holding pre-vapor formulation. When a level of the flavoring additive in the pre-vapor formulation falls below a threshold level, an adult vaper's sensory experience may be affected during vaping.

SUMMARY

At least one example embodiment relates to a cartridge and/or an e-vaping device including a cartridge.

In an example embodiment, a cartridge may include a housing including a first end opposite a second end, a liquid supply reservoir in the housing and configured to store a pre-vapor formulation, a vaporizer, and a porous plug. The vaporizer may be in liquid communication with the liquid supply reservoir. The vaporizer may be configured to generate a vapor from heating a portion of the pre-vapor formulation. The porous plug may be connected to the housing and separated from the liquid supply reservoir. The porous plug may be permeable to the vapor. The porous plug may enclose a flavoring additive contacting a storage material. The flavoring additive may be configured to at least partially elute from the storage material or at least partially volatilize from the storage material if the vapor flows through the porous plug.

The flavoring additive may include one of menthol, limonene, benzaldehdye, and ethyl vanoline. The storage material may include one of a botanic material and a non-botanic material.

The flavoring additive may include menthol.

The storage material may include one of a botanic material and a non-botanic material. The botanic material may include one of menthol crystal, mint leaves, tea leaves, coffee powder, dry flowers, lemon grass, orange peels, star anise, and clove. The non-botanic material may include one of paper, cellulose, zerolite, cellulose acetate with acid, cellulose acetate without acid, and a polymer.

The porous plug may be a bag containing the flavoring additive and the storage material. A material of the bag may include one of porous aluminum foil, perforated aluminum foil, nylon, filter paper, silk, plastic, and cellulose acetate.

The pre-vapor formulation may be in the liquid supply reservoir. The pre-vapor formulation may include nicotine and at least one of glycerin (Gly) and propylene glycol. The flavoring additive may be configured to adsorb to the storage material or absorb in the storage material.

The porous plug may be inside the housing. A volume ratio of the liquid supply reservoir to the porous plug may be in a range of about 10:90 (liquid supply volume:porous plug volume) to about 90:10 (liquid supply volume:porous plug volume).

The porous plug may be inside the housing. A weight ratio of the flavoring additive to the storage material may range from about 1:99 (flavoring additive:storage material) to 80:20 (flavoring additive:storage material).

The porous plug may be inside the housing. The porous plug may be spaced apart from the vaporizer. The porous plug may be adjacent to the first end.

The cartridge may include a mouth-end insert and an inner gasket. The mouth-end insert may be in the housing at the first end. The inner gasket may be in the housing. The porous plug may be between the inner gasket and the mouth-end insert.

The porous plug may be inside the housing. The porous plug may be adjacent to the vaporizer. The porous plug may be spaced apart from the first end.

The cartridge may further include gauze in the housing between the vaporizer and the first end. The gauze may define an air channel. The gauze may include a notch. The porous plug may extend into the notch of the gauze.

The cartridge may further include a tip structure connected to the first end of the housing. The tip structure may be outside the housing. The porous plug may be in the tip structure.

In an example embodiment, a method of making an e-vaping device may include connecting the above-described cartridge to a battery section such that the battery and the cartridge are removably coupled to each other. The battery section may include a power supply. The power supply may be configured to provide power to the vaporizer for the vaporizer generating the vapor from the pre-vapor formulation.

In an example embodiment, a cartridge may include a housing, a liquid supply reservoir, a vaporizer, and a porous plug. The housing may include first and second ends that are opposite each other and in fluid communication with each other through a channel. The liquid supply reservoir may be in the housing and configured to store pre-vapor formulation. The vaporizer may be in the housing and in liquid communication with the liquid supply reservoir. The vaporizer may be configured to generate a vapor from the pre-vapor formulation. The porous plug may be separated from the liquid supply reservoir. The porous plug may enclose a flavoring additive and at least one of a botanic material and a non-botanic material. The porous plug may be permeable to the vapor. The porous plug may be one of in the housing adjacent to the vaporizer between the first end and the vaporizer, in the housing adjacent to the first end, and connected to the first end of the housing.

The botanic material may include one of menthol crystal, mint leaves, tea leaves, coffee powder, dry flowers, lemon grass, orange peels, star anise, and clove. The non-botanic material may include one of paper, cellulose, zerolite, cellulose acetate with acid, cellulose acetate without acid, and a polymer.

The porous plug may be a bag containing the flavoring additive and the storage material. A material of the porous plug may include one of perforated aluminum foil, porous aluminum foil, nylon, filter paper, silk, plastic, and cellulose acetate. The flavoring additive may be adsorbed onto the storage material or absorbed in the storage material.

At least one example embodiment relates to a porous plug.

In an example embodiment, a porous plug may include a porous containment structure, a storage material, and a flavoring additive. The porous containment structure may be configured to be permeable to a vapor generated from a pre-vapor formulation. The pre-vapor formulation may include nicotine and a vapor former. The storage material may be enclosed by the porous containment structure. The storage material may include one of a botanic material and a non-botanic material. The flavoring additive may be enclosed in the porous containment structure and may contact the storage material. The flavoring additive may be configured to at least partially elute from the storage material or at least partially volatilize from the storage material if the vapor flows through the porous containment structure.

A material of the porous containment structure may include one of porous aluminum foil, perforated aluminum foil, nylon, filter paper, silk, plastic, and cellulose acetate. The flavoring additive may include one of menthol, limonene, benzaldehyde, and ethyl vanoline.

The botanic material may include one of menthol crystal, mint leaves, tea leaves, coffee powder, dry flowers, lemon grass, orange peels, star anise, and clove. The non-botanic material may include one of paper, cellulose, zerolite, cellulose acetate with acid, cellulose acetate without acid, and a polymer.

At least one example embodiment relates to a method of making a cartridge and/or an e-vaping device including the cartridge.

In an example embodiment, a method of making a cartridge may include forming a liquid supply reservoir and a vaporizer in a housing and arranging a porous plug connected to the housing and separated from the liquid supply reservoir. The liquid supply reservoir may be configured to store a pre-vapor formulation. The vaporizer may be in liquid communication with the liquid supply reservoir. The vaporizer may be configured to generate a vapor from heating a portion of the pre-vapor formulation. The porous plug may be permeable to the vapor. The porous plug may enclose a flavoring additive contacting a storage material. The flavoring additive may be configured to at least partially elute from the storage material or at least partially volatilize from the storage material if the vapor flows through the porous plug.

The storage material may include one of a botanic material and a non-botanic material. The botanic material may include one of menthol crystal, mint leaves, tea leaves, coffee powder, and dry flowers. The non-botanic material may include one of paper, cellulose, zerolite, and a polymer.

The flavoring additive may include one of menthol, limonene, benzaldehyde, and ethyl vanoline.

The porous plug may be a bag containing the flavoring additive and the storage material. A material of the bag may include one of aluminum foil, nylon, filter paper, silk, plastic, and cellulose acetate.

In an example embodiment, an e-vaping device may include a housing, a liquid supply reservoir in the housing and configured to store a pre-vapor formulation, a vaporizer in the housing and in liquid communication with the liquid supply reservoir, a porous plug connected to the housing and separated from the liquid supply reservoir, and a power supply configured to selectively supply power to the vaporizer. The vaporizer is configured to generate a vapor from heating a portion of the pre-vapor formulation. The porous plug is permeable to the vapor. The porous plug encloses a flavoring additive contacting a storage material. The flavoring additive is configured to at least partially elute from the storage material or at least partially volatilize from the storage material if the vapor flows through the porous plug.

The e-vaping device may further include a cartridge and a battery section. The battery section may be configured to be removably coupled to the cartridge. The cartridge may include the housing, the liquid supply reservoir, the vaporizer, and the porous plug. The battery section may include the power supply. The battery section may be configured to provide power to the vaporizer if the battery section senses a negative pressure being applied to a first end of the cartridge.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1A:
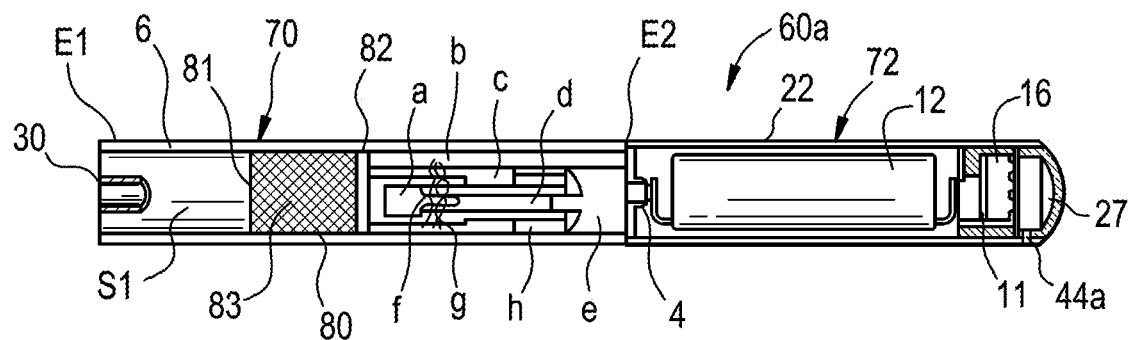
FIG. 1A to 1C are cross-sectional views of e-vaping devices according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

When the terms "about" or "substantially" are used in this specification in connection with a numerical value, it is intended that the associated numerical value include a tolerance of ±10% around the stated numerical value unless the context indicates otherwise. Moreover, unless the context indicates otherwise, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%.

A pre-vapor formulation is a material or combination of materials that may be transformed into a vapor. For example, the pre-vapor formulation may be a liquid, solid and/or gel formulation including, but not limited to, water, beads, solvents, active ingredients, ethanol, and/or vapor formers such as glycerin and/or propylene glycol. For example, a vapor may be generated from the pre-vaporization formulation by heating the vaporization formulation above a threshold temperature (e.g., a boiling point of the pre-vaporization formulation).

Figure 1B:
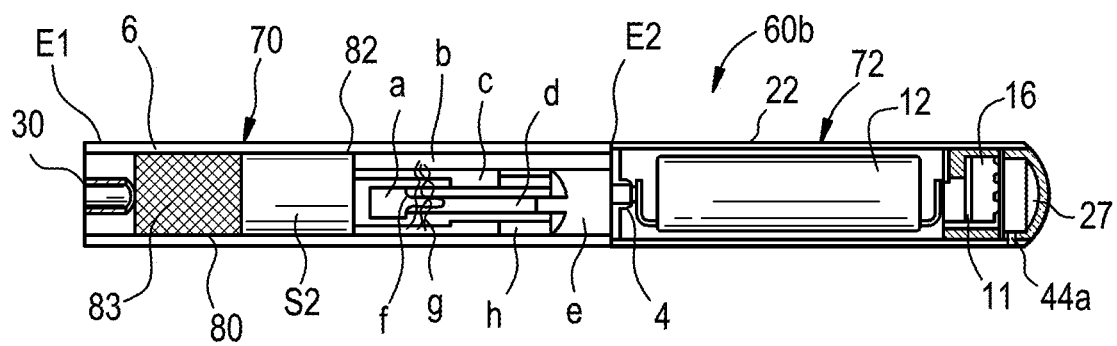
Figure 1C:
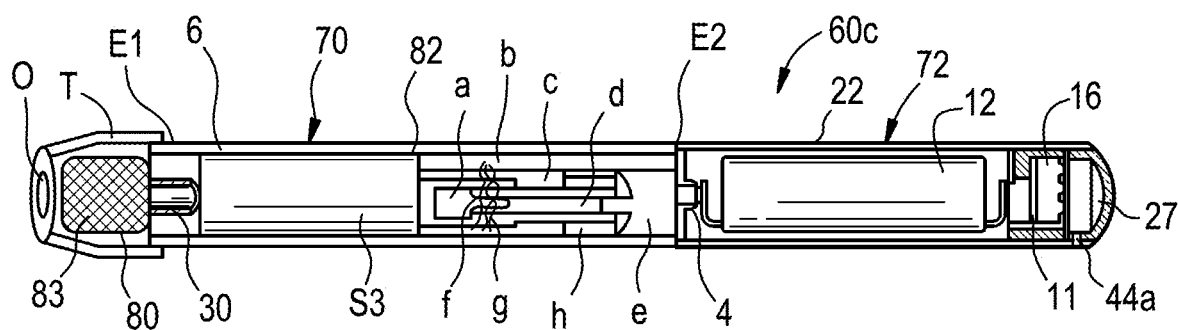

FIG. 1A to 1C are cross-sectional views of e-vaping devices according to some example embodiments.

Referring to FIG. 1A, according to an example embodiment, an e-vaping device 60*a* may include a first section 70 and a second section 72. The first section 70 may be configured to be removably coupled to the second section 72 and vice versa. The e-vaping device 60*a* may be made by connecting the first section 70 to the second section 72 such that the first section 70 and the second section 72 are removably coupled to each other. The first section 70 may be a cartridge. The first section 70 may also be referred to as a cartomizer if the first section 70 includes a vaporizer (e.g., heater and wick). The second section 72 may be a battery section.

The first section 70 may include a first end E1 opposite a second end E2. The housing 6 of the first section 70 may be a cylindrical shape (e.g., tubular), but is not limited thereto and may be other shapes. The housing 6 may be formed of a metal, a metal alloy, a ceramic, a plastic, or a composite material containing a combination thereof. For example, the housing 6 may be formed of polypropylene, polyethylene, polyetheretherketone (PEEK), or polyacetate, but is not limited thereto.

A mouth-end insert 30 may be arranged inside the housing 6 at the first end E1 of the housing 6. The mouth-end insert 30 may include a tube in fluid communication with a space S1 inside the housing 6 that is adjacent to the mouth-end-insert 30. The mouth-end insert 30 may be formed of a plastic and/or other suitable material.

The first section 70 may further include an air gap a, outer gauze b, inner gauze c, air channel d, gasket e, heating element (e.g., wire) f, wick g, heating wire connector h inside the housing 6, and a porous plug 80. The inner gauze c and outer gauze b may define a liquid supply reservoir in the housing 6. The liquid supply reservoir may be configured to store a pre-vapor formulation. Together, the heating wire f and wick g may define a vaporizer in liquid communication with the liquid supply reservoir. The pre-vapor formulation may include nicotine, water, and a vapor former (e.g., glycerin and/or propylene glycol), but is not limited thereto. For example, the pre-vapor formulation may further include an acid.

The acid may be one of pyruvic acid, formic acid, oxalic acid, glycolic acid, acetic acid, isovaleric acid, valeric acid, propionic acid, octanoic acid, lactic acid, levulinic acid, sorbic acid, malic acid, tartaric acid, succinic acid, citric acid, benzoic acid, oleic acid, aconitic acid, butyric acid, cinnamic acid, decanoic acid, 3,7-dimethyl-6-octenoic acid, 1-glutamic acid, heptanoic acid, hexanoic acid, 3-hexenoic acid, trans-2-hexenoic acid, isobutyric acid, lauric acid, 2-methylbutyric acid, 2-methylvaleric acid, myristic acid, nonanoic acid, palmitic acid, 4-pentenoic acid, phenylacetic acid, 3-phenylpropionic acid, hydrochloric acid, phosphoric acid, sulfuric acid, and combinations thereof. The acid also may be incorporated in the pre-vapor formulation in the form of a salt.

The porous plug 80 may be positioned inside the housing 6 between the first end E1 and the second end E2 of the housing. The porous plug 80 may be in contact with the housing 6. The porous plug 80 may be separated from the liquid supply reservoir defined by the inner gauze c and outer gauze b. The porous plug 80 may be next to the heating wire f and separated from the mouth-end insert 30 by the first space S1.

The porous plug 80 may be in the housing 6 and adjacent to the vaporizer (e.g., heating wire f and wick g). The porous plug 80 may be spaced apart from the first end E1. An inner surface of the housing 6 may define a space S1 between the respective positions of the mouth-end insert 30 and porous plug 80 in the housing 6. A gasket 82 may be between the porous plug 80 and the vaporizer. The gasket 82 may be referred to as a downstream gasket and/or an inner gasket. The mouth-end insert 30 may be in the housing 6 at the first end E1 and the gasket e may be in the housing at the second end E2. As such, in the first section 70 of the e-vaping device 60*a*, the porous plug 80 may be positioned between the gasket e and the mouth-end insert 30. Additionally, the porous plug 80 may be spaced apart from the first end E1 and/or mouth-end insert 30 by the space S1.

The porous plug 80 may include (or consist essentially of) a containment structure 81, a storage medium 83 inside the containment structure 81, and a flavoring additive contacting the storage material 83. The porous plug 80 may enclose the flavoring additive contacting the storage material 83. For example, the containment structure 81 of the porous plug 80 may be a bag containing the flavoring additive and the storage material inside the bag. The containment structure 81 may be a porous containment structure 81. A material of the containment structure 81 (e.g., bag) for the porous plug 80 may include one of porous aluminum, perforated aluminum foil, nylon, filter paper, silk, plastic, cellulose acetate, and combinations thereof. The material of the containment structure 81 may porous and/or perforated. The storage material may include one of a botanic material and a non-botanic material. The botanic material may include at least one of tea (e.g., tea leaves), menthol crystal, mint leaves, lemon grass, orange peels, coffee powder, dry flowers (e.g., dry rose flowers), star anise, clove, and combinations thereof, but is not limited thereto. The non-botanic material may include one of paper, cellulose, zerolite, and a polymer (e.g., poly-lactic acid), but example embodiments are not limited thereto. The botanic material and/or non-botanic material may include other materials than those described above, and the other materials may be selected based on a desired flavor and/or aroma. The flavoring additive may be configured to adsorb to the storage material or absorb in the storage material. The flavoring additive may include one of menthol, limonene, benzaldehyde, ethyl vanoline, and combinations thereof.

A volume ratio of the liquid supply reservoir to the porous plug 80 may be in a range of about 10:90 (liquid supply volume:porous plug volume) to about 90:10 (liquid supply volume:porous plug volume). A weight ratio of the flavoring additive to the storage material may range from about 1:99 (flavoring additive:storage material) to 80:20 (flavoring additive:storage material).

The first end E1 and the second end E2 of the housing may be in fluid communication with each other through a channel. The channel may be defined by an inner surface of the housing 6 and extend through the space S1, porous plug 80, air gap a, air channel d, and the gasket e. The gasket e may be porous and/or hollow.

The second section 72 may include an outer housing 22. The outer housing 22 may be a cylindrical shape, but it not limited thereto and may be other shapes. The second section 72 may include a power supply 12 (e.g., battery), control circuitry 11, and a puff sensor 16 inside the outer housing 22. The control circuitry 11 and puff sensor 16 may be connected to a heater activation light 27. The heater activation light 27 may be a light-emitting diode (LED). One end of the second section 72 may include a power supply connector 4 (e.g., a battery connector). The control circuitry 11, puff sensor 16, and heater activation light 27 may be positioned at the other end of the second section 27. The power supply 12 may be between the power supply connector 4 and the control circuitry 11. The heating wire connector h in the first section 70 may be used to connect the vaporizer to a power supply connector 4 in the second section 72.

The outer housing 22 may be formed of any one of the materials described above for forming the housing 6 of the first section 70. The housing 6 of the first section 70 and the outer housing 22 of the second section 70 may be formed of the same material or different materials. The outer housing 22 may define at least one air inlet 44a positioned at an end of the second section 72 adjacent to the puff sensor 16. The puff sensor 16 may sense when a negative pressure is applied to the mouth-end insert 30 of the e-vaping device 60a. Such action may draw air into the e-vaping device 60a through the air inlet 44a to initiate the puff sensor 16 and may also draw air into the e-vaping device 60a from air inlets (not shown) defined by the housing 6 of the first section 70. The air inlet 44a may be in fluid communication with the mouth-end insert 30 so that a draw upon the mouth-end insert 30 activates the puff sensor 16. The air from the air inlet 44a can then flow through the outer housing 22 and/or housing 6 to the mouth-end insert 30.

The power supply 12 may be a Lithium-ion battery or one of its variants, for example a Lithium-ion polymer battery. Alternatively, the battery may be a Nickel-metal hydride battery, a Nickel cadmium battery, a Lithium-manganese battery, a Lithium-cobalt battery or a fuel cell. The power supply 12 may be rechargeable (e.g., rechargeable) and include circuitry allowing the battery to be chargeable by an external charging device.

The power supply 12 may be configured to provide power to the vaporizer in the first section 70 if the puff sensor 16 senses an application of negative pressure to the first end E1 and/or mouth-end insert 30 of the first section 70 when the first section 70 and the second section 72 are removably coupled to each other.

In some example embodiments, the control circuitry 11 may be on a printed circuit board. The control circuitry 11 may be electrically connected to the heater activation light 27 (e.g., LED) and may also be electrically connected to the puff sensor 16. The control circuitry 11 may include one or more Central Processing Units (CPUs), digital signal processors (DSPs), one or more circuits, application-specific-integrated-circuits (ASICs), field programmable gate arrays (FPGAs), and/or computers or the like configured as special purpose machines to perform the functions of the control circuitry 11. In some example embodiments, the control circuitry 11 may be configured to control a supply of electrical power to the vaporizer in the e-vaping device. For example, the control circuitry 11 may selectively supply electrical power from the power supply 12 to the vaporizer (e.g., heating wire f) to control a heating cycle of the vaporizer. In another example, the control circuitry 11 may selectively supply electrical power from the power supply 12 to the vaporizer based on adult vaper's interaction with one or more user interfaces included in the e-vaping device, including an activation button. In some example embodiments, the control circuitry may selectively supply electrical power from the power supply 12 to the vaporizer based on a receiving a negative-pressure signal from the puff sensor 16. The puff sensor 16 may include a microelectromechanical system (MEMS) sensor for determining when a negative pressure has been applied to the first end E1 and/or mouth-end insert 30 of the e-vaping device 10. When the puff sensor 16 detects the application of a negative pressure to the first end E1 and/or mouth-end insert 30, the puff sensor 16 may transmit a negative-pressure signal to the control circuitry 11.

The vaporizer, which includes the heating wire f and the wick g, may be configured to generate a vapor from heating a portion of the pre-vapor formulation. When negative pressure is applied to the first end E1 and/or mouth-end insert 30 of the first section, the wick g may transport a portion of the pre-vapor formulation towards the heating wire f of the vaporizer. The power supplied from the power supply 12 to the vaporizer may heat the heating wire f and generate a vapor from heating the portion of pre-vapor formulation transported to the heating wire f using the wick g.

When negative pressure is applied to the mouth-end insert 30, causing the vaporizer to generate a vapor from a portion of the pre-vapor formulation, the vapor may flow from the vaporizer to the mouth-end insert 30. The porous plug 80 may be permeable to the vapor flowing through the first section 70 to the mouth-end insert 30. The flavoring additive may contact the storage material 83 in the porous plug 80 and may be configured to at least partially elute from the storage material or at least partially volatilize from the storage material if the vapor flows through the porous plug 80.

Referring to FIG. 1B, according to an example embodiment, an e-vaping device 60b may be the same as the e-vaping device 60a described previously with reference to FIG. 1A except for the following differences.

For example, the position of the porous plug 80 in the housing 6 may be different in the e-vaping device 60b compared to the e-vaping device 60a. As shown in FIG. 1B, in the e-vaping device 60b, the porous plug 80 may be inside the housing 6 adjacent to the first end E1. The porous plug 80 may be next to the mouth-end insert 30. Additionally, the porous plug 80 may be spaced apart from the vaporizer (e.g., heating wire f and wick g). An inner surface of the housing 6 may define a space S2 between the respective positions of the vaporizer and porous plug 80 in the housing 6. The mouth-end insert 30 may be in the housing at the first end E1 and the gasket e may be in the housing at the second end E2. As such, in the first section 70 of the e-vaping device 60b, the porous plug 80 may be positioned between the gasket e and the mouth-end insert 30.

Referring to FIG. 1C, according to an example embodiment, an e-vaping device 60c may be the same as the e-vaping devices 60a and 60b described previously with reference to FIGS. 1A and 1B, except for the following differences.

For example, the position of the porous plug 80 in the housing 6 may be different in the e-vaping device 60c compared to the e-vaping devices 60a and 60b. As shown in FIG. 1C, the first section 70 of the e-vaping device 60b may include a tip structure T. The tip structure T may be connected to the first end E1 of the housing 6. The tip structure T may be outside of the housing 6. A base of the tip structure T may fit around an outer surface of the housing 6 at the first end E1, although one of ordinary skill in the art would appreciate that other arrangements may be used. The tip structure T may be connected to the first end E1 of the housing 6 using an adhesive to provide a sealed connection between tip structure T and the first end E1 of the housing 6. The tip structure T may be formed of a plastic material, wood, and/or paper, but is not limited to these materials.

An inner surface of the tip structure T may define a cavity. One end of the tip structure T may define an opening O that is in fluid communication through the base of the tip structure T with a space S3 defined by the inner surface of the housing 6. The space S3 may be between the gasket 82 and the mouth-end insert 30 and/or the first end E1. The porous plug 80 may be in the tip structure T. For example, the porous plug 80 may be positioned inside the cavity of the tip structure T between the opening O of the tip structure T and the first end E1 of the housing 6. The mouth-end insert 30 may be included in the housing 6 at the first end E1. Alternatively, the mouth-end insert 30 may be omitted if desired.

When negative pressure is applied to the opening O of the tip structure T, the puff sensor 16 may sense the negative pressure and provide a signal to the control circuitry 11. In response to receiving a negative-pressure signal, the control circuitry 11 may control the vaporizer to generate a vapor from a portion of the pre-vapor formulation. The vapor may flow from the vaporizer to the opening O of the tip structure T. The porous plug 80 may be permeable to the vapor flowing through the first section 70 to the opening O of the tip structure T. The flavoring additive may contact the storage material 83 in the porous plug 80 and may be configured to at least partially elute from the storage material 83 or at least partially volatilize from the storage material 83 if the vapor flows through the porous plug 80.

In an example embodiment, at least one flavoring additive (e.g., menthol, limonene, benzaldehyde, ethyl vanoline, etc.) may be encapsulated in a storage material (e.g., a biopolymer such as gelatin or agar). One or more capsules containing the flavoring additive and storage material may be placed in a filter material (e.g., cellulose acetate, paper, or a plastic) and used to form the tip structure T shown in FIG. 1C. A tip structure T including encapsulated flavor may be used as a mouthpiece in an e-vaping device according to example embodiments. An adult vaper can squeeze this filter to break the capsule to release the flavor before putting his or her mouth around the tip structure including encapsulated flavor. The released flavor can then be eluded into the passing vapor when a negative pressure is applied to the tip structure. If the tip structure T in FIG. 1C is formed using a filter containing encapsulated flavor, then the porous plug 80 inside the tip structure T may be omitted. Alternatively, the porous plug 80 may be placed inside the tip structure formed using a filter containing encapsulated flavor.

Figure 2:
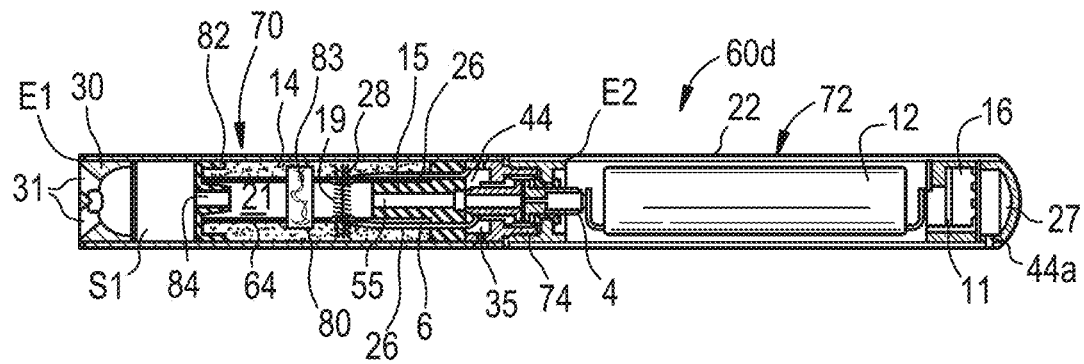
FIG. 2 is a cross-sectional view of an e-vaping device according to an example embodiment.

FIG. 2 is a cross-sectional view of an e-vaping device according to an example embodiment.

Referring to FIG. 2, according to an example embodiment, an e-vaping device 60d may include a first section 70 and a second section 72. The first section 70 and the second section 72 may be removably coupled to each other. For example, the first section 70 and the second section 72 may be removably coupled to each other at a threaded joint 74 (e.g., threaded portion) or by other means such as a snug-fit, snap-fit, detent, clamp, and/or clasp. The e-vaping device 60d may be made when the first section 70 and the second section 72 are connected to each other such that they are removably coupled to each other.

In the first section 70, the housing 6 may define at least one air inlet 44. The air inlet 44 may be adjacent to the second end E2. The air inlet 44 may be in fluid communication with a space 35 between the second end E2 of the housing 6 and a seal 15 inside the housing 6. The space 35 may be defined between the seal 15 and a gasket at the second end E2 of the housing 6 and/or the threaded connection 274. An inner surface of the seal 15 may define a central channel 55. The housing 6 may include the mouth-end insert 30 at the first end E1 inside the housing 6. The mouth-end insert 30 may define a plurality (e.g., two, three, four, etc.) diverging outlets 31. A space S1 may be defined by an inner surface of the housing 6, the mouth-end insert 30, and a gasket 82 in the housing 6. An inner surface of the gasket 82 may define a gasket passage 84 in fluid communication with the space S1, diverging outlets 31, and a central air passage 21.

An inner casing 64 (e.g., an inner tube) may be in the housing 6 between the gasket 82 and the seal 15. The seal 15 may extend into one end of the inner casing 64 and the gasket 82 may extend into the other end of the inner casing 64. A liquid supply reservoir 14 may be in the housing 6 between the housing 6 and the inner casing 64. The gasket 82 and seal 15 may close off respective ends of the liquid supply reservoir 14. The outer and inner surfaces of the liquid supply reservoir 14 may be defined by a space between an inner surface of the housing 6 and an outer surface of an inner casing 64. The liquid supply reservoir 14 may include a liquid storage material configured to store a pre-vapor formulation. The liquid storage material may be a fibrous material such as gauze (e.g., cotton), but example embodiments are not limited thereto. Optionally, the liquid storage material may be omitted from the liquid supply reservoir 22.

The housing 6 may include a vaporizer in the housing 6 and connected to the liquid supply reservoir 14. The central channel 55 may be adjacent to the vaporizer. The vaporizer may include a fluid-transport structure that is configured to transport the pre-vapor formulation from the liquid supply reservoir 14 to the central air passage 21 if negative pressure is applied to the first end E1 and/or mouth-end insert 30 of the first section 70. For example, the fluid-transport structure may be a wick 28. The vaporizer may further include a heater 19.

The wick 28 may extend from one portion of the liquid supply reservoir 14 through the central air passage 21 into another portion of the liquid supply reservoir 14. An inner surface of the inner casing 64 may define the central air passage 21. The central air passage 21 may be in fluid communication with the gasket passage 84 and the central channel 55. The heater 19 may be in the form of a wire coil, a planar body, a ceramic body, a single wire, a cage of resistive wire or any other suitable form. The heater 19 may be wrapped around a part of the wick 28 such as a part of the wick 28 in the central air passage 21. The wick 28 (or a plurality of wicks 28) may transport a portion of the pre-vapor formulation proximate to the heater 19 if negative pressure is applied to the first end E1 and/or mouth-end insert 30 of the first section 70.

The wick 28 may be constructed of a fibrous and flexible material. The wick 28 may include at least one filament that is configured to transport pre-vapor formulation from the liquid supply reservoir 14 to the heater 19 when negative pressure is applied to the mouth-end insert 30 and/or first end E1 of the e-vaping device 60d. The wick 28 may be a bundle of filaments, such as a bundle of glass (or ceramic) filaments. The wick 28 may include a group of windings of glass filaments (e.g., three windings), all which arrangements are capable of drawing pre-vapor formulation via capillary action via interstitial spacing between the filaments.

The porous plug 80 may be positioned in the housing 6 of the first section 70 at a location adjacent to the vaporizer (e.g., heater 19 and wick 28). The porous plug 80 may extend from one part of the liquid supply reservoir 14 across the central air passage 21 to another part of the liquid supply reservoir 14. The porous plug 80 may be between the vaporizer 80 and the gasket 82. The porous plug 80 may be between the vaporizer (e.g., heater 19 and wick 28) and the first end E1. The liquid supply reservoir 14 may include gauze that defines a channel in which the inner casing 64 is positioned. The gauze in the liquid supply reservoir 14 may include a notch at the parts where the porous plug 80 extends into the liquid supply reservoir 14. The porous plug 80 may extend through openings in the inner casing 64 into the notches defined in the gauze. Although not illustrated, a liner (e.g., plastic) may surround end portions of the porous plug that extend into the liquid supply reservoir 14. The liner may provide separation between the porous plug 80 and the liquid supply reservoir 14. Alternatively, a portion of the gauze may be more dense surrounding the ends of the porous plug 80 that extend into the notches compared to other portions of the gauze in the liquid supply reservoir 14.

The first section 70 may include gauze in the housing 6 between the vaporizer and the first end E1. For example, the gauze may be in the liquid supply reservoir 14. The gauze may define an air channel and include a notch. The porous plug 80 may in the notch of the gauze.

The first section 70 may include electrical leads 26 that connect to opposite ends of the heater 19. The electrical leads 26 may extend through the liquid supply reservoir 14 and the seal 15 to connect to opposite ends of the heater 19. When the first section 70 and the second section 72 are removably coupled to each other, the electrical leads may be electrically connected to the power supply 12 through the contact 4.

The vaporizer may be configured to generate a vapor from the pre-vapor formulation in the liquid supply reservoir 14. For example, the control circuit 11 may control the power supply 12 so the power supply 12 supplies power to the heater 19 through the electrical leads 26 if the puff sensor 16 senses an application of negative pressure to the first end E1 and/or mouth-end insert 30 of the first section 70. The power supplied to the heater 19 may generate a vapor by heating a portion of the pre-vapor formulation that the wick 28 transports proximate to the heater 19 when negative pressure is applied to the first end E1 and/or mouth-end insert 30 of the first section 70.

In an example embodiment, a method of making the first section 70 may include forming the liquid supply reservoir 14 and the vaporizer (e.g., wick 28 and heater 19) in the housing 6 so the vaporizer is in liquid communication with the liquid supply reservoir 14. The method may further include arranging the porous plug 80 so the porous plug is connected to the housing 6. Alternatively, the porous plug 80 may be separated from the liquid supply reservoir 14 by at least the gasket 82. The porous plug 80 may be permeable to a vapor generated from the pre-vapor formulation. The porous plug 80 may include a flavoring additive contacting a storage structure 83. For example, the porous plug 80 may enclose a flavoring additive contacting a storage structure 83. The porous plug 80 may be contained by a containment structure 81. The flavoring additive may be configured to at least partially elute from the storage material or at least partially volatize from the storage material if the vapor flows through the porous plug 80.

Figure 3:
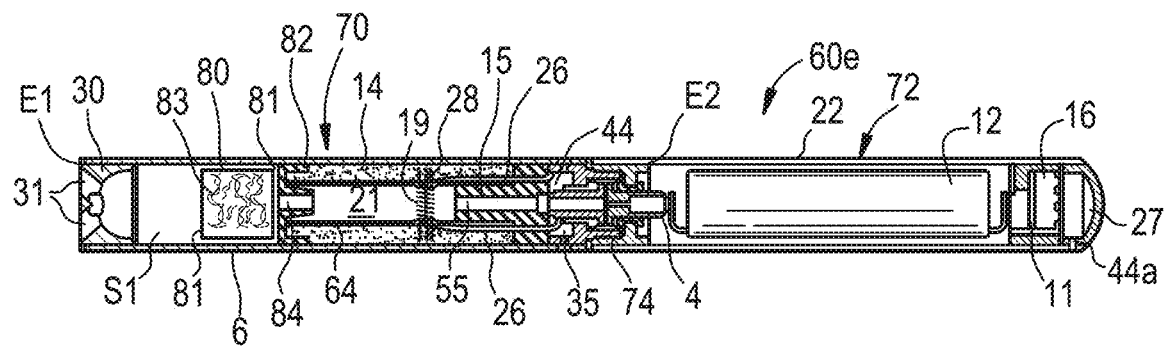
FIG. 3 is a cross-sectional view of an e-vaping device according to an example embodiment.

FIG. 3 is a cross-sectional view of an e-vaping device according to an example embodiment.

Referring to FIG. 3, according to an example embodiment, an e-vaping device 60e may be the same as the e-vaping device 60d described previously with reference to FIG. 2, except for the following differences. In the first section 70 of the e-vaping device 60e, the porous plug 80 may be positioned in the housing 6 between the mouth-end insert 30 and the gasket 82. Also, in the first section 70 of the e-vaping device 60e, the liquid supply reservoir 14 may include gauze without the notch for positioning the porous plug 80 in the e-vaping device 60d. Similarly, the inner casing 64 in the first section 70 of the e-vaping device 60e may be formed without defining openings that that the porous plug 80 extends through.

The porous plug 80 may be separated from the liquid supply reservoir 14 at least because the gasket 82 may be between the porous plug 80 and the liquid supply reservoir 14. The porous plug 80 may be adjacent to the first end E1 and mouth-end insert 30, but spaced apart from the mouth-end insert 30 in the housing 6 by a first space S1.

Figure 4:
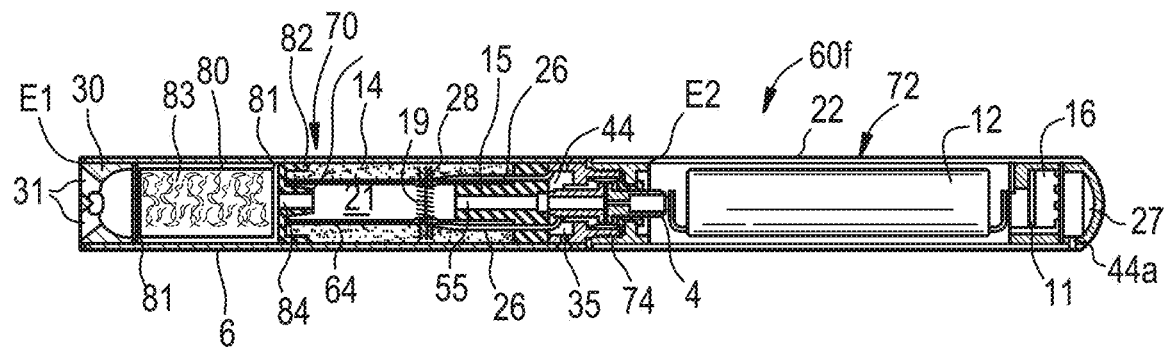
FIG. 4 is a cross-sectional view of an e-vaping device according to an example embodiment.

FIG. 4 is a cross-sectional view of an e-vaping device according to an example embodiment.

Referring to FIG. 4, according to an example embodiment, an e-vaping device 60f may be the same as the e-vaping device 60e described previously with reference to FIG. 3, except for the following differences. In the first section 70 of the e-vaping device 60f, the porous plug 80 may be positioned in the housing 6 between the mouth-end insert 30 and the gasket 82. The porous plug 80 may be connected to the first end E1 of the first section 70. The porous plug 80 may be positioned between the gasket 82 and the mouth-end insert 30 snuggly without the space S1 shown in FIG. 3. The porous plug 80 may be in contact with the mouth-end insert 30 and/or the gasket 82. The porous plug 80 may be separated from the liquid supply reservoir 14 at least because the gasket 82 may be between the porous plug 80 and the liquid supply reservoir 14.

Figure 5:
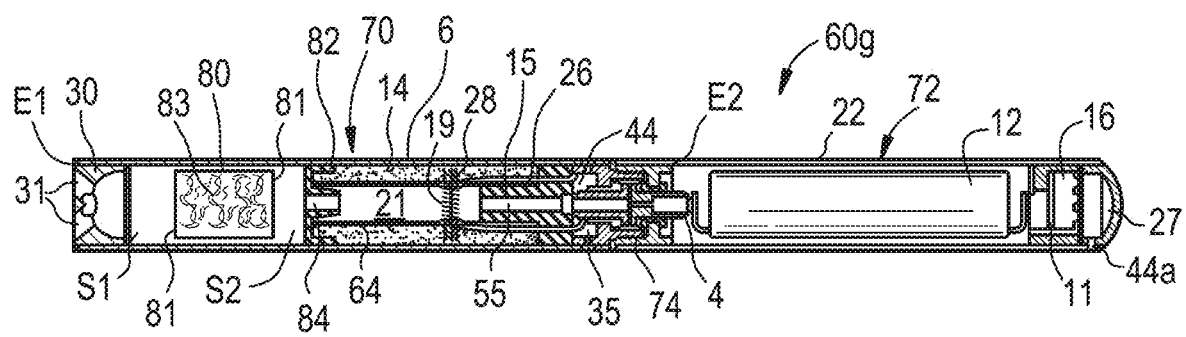
FIG. 5 is a cross-sectional view of an e-vaping device according to an example embodiment.

FIG. 5 is a cross-sectional view of an e-vaping device according to an example embodiment.

Referring to FIG. 5, according to an example embodiment, an e-vaping device 60g may be the same as the e-vaping devices 60e and 60f described previously with reference to FIGS. 3 and 4, except for the following differences. In the first section 70 of the e-vaping device 60g, the porous plug 80 may be positioned in the housing 6 between the mouth-end insert 30 and the gasket 82. The containment structure 81 of the porous plug 80 on one side may be spaced apart from the mouth-end insert 30 in the housing 6 by a first space S1. The containment structure 81 of the porous plug 80 on a different side may be spaced apart from the gasket 82 by a second space S2. The porous plug 80 may be separated from the liquid supply reservoir 14 at least because the gasket 82 and the second space S2 may be between the porous plug 80 and the liquid supply reservoir 14. Although not illustrated, the first section 70 of the e-vaping device 60g may be modified so the porous plug 80 is in contact with the mouth-end insert 30 and separated by the gasket 82 by the second space S2.

Figure 6:
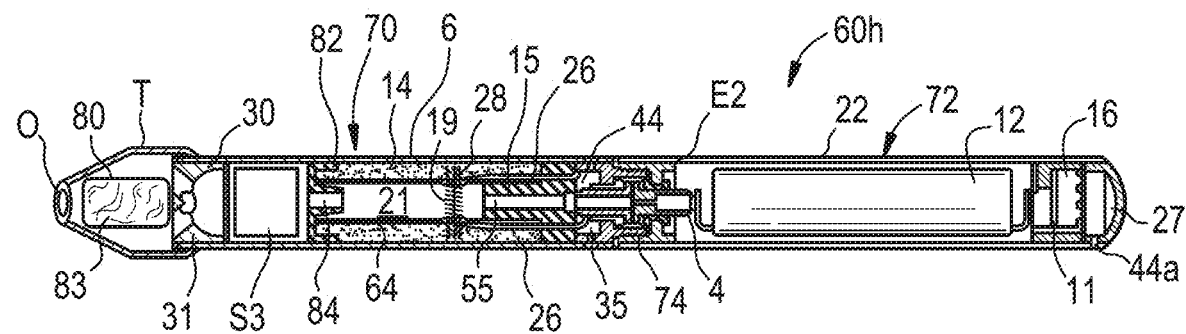
FIG. 6 is a cross-sectional view of an e-vaping device according to an example embodiment.

FIG. 6 is a cross-sectional view of an e-vaping device according to an example embodiment.

Referring to FIG. 6, according to an example embodiment, an e-vaping device 60g may be the same as the e-vaping devices 60e to 60g described previously with reference to FIGS. 3 to 5, except for the following differences. In the first section 70 of the e-vaping device 60h, the porous plug 80 may be positioned outside of the housing 6. As shown in FIG. 6, the first section 70 of the e-vaping device 60g may include a tip structure T connected to the first end E1 of the housing 6. The tip structure T may be outside of the housing 6. A base of the tip structure T may fit around an outer surface of the housing 6 at the first end E1, although one of ordinary skill in the art would appreciate that other arrangements may be possible. The tip structure T may be connected to the first end E1 of the housing 6 using an adhesive to provide a sealed connection between tip structure T and the first end E1 of the housing 6. The tip structure T may be formed of a plastic material, wood, and/or paper, but is not limited to these materials.

An inner surface of the tip structure T may define a cavity. One end of the tip structure T may define an opening O that is in fluid communication through the base of the tip structure T with a space S3 defined by the inner surface of the housing 6. The space S3 may be between the gasket 82 and the mouth-end insert 30 and first end E1. The porous plug 80 may be in the tip structure T. For example, the porous plug 80 may be positioned inside the cavity of the tip structure T between the opening O of the tip structure T and the first end E1 of the housing 6. The mouth-end insert 30 may be included in the housing 6 at the first end E1. Alternatively, the mouth-end insert 30 may be omitted if desired.

When negative pressure is applied to the opening of the tip structure T, the puff sensor 16 may sense the negative pressure and the control circuitry 11 may control the vaporizer to generate a vapor from a portion of the pre-vapor formulation. The vapor may flow from the vaporizer to the opening O of the tip structure T. The porous plug 80 may be permeable to the vapor flowing through the first section 70 to the opening O of the tip structure T. The flavoring additive may contact the storage material 83 in the porous plug 80 and may be configured to at least partially elute from the storage material 83 or at least partially volatilize from the storage material 83 if the vapor flows through the porous plug 80.

Like the e-vaping device 60c described previously in FIG. 1C, in an example embodiment, the tip structure T of the e-vaping device 60h may include a plurality of capsules placed in a filter material. The capsules may each include at least one flavoring additive (e.g., menthol, limonene, benzaldehyde, ethyl vanoline, etc.) placed in a filter material (e.g., cellulose acetate, paper, or plastic) and may be used to form the tip structure T shown in FIG. 6. The tip structure including encapsulated flavor may be placed around an outer surface of the housing 6 at the first end E1 of the e-vapor device 60 illustrated in FIG. 1C. If the tip structure T in FIG. 6 is formed using a filter containing encapsulated flavor, then the porous plug 80 inside the tip structure T may be omitted. Alternatively, the porous plug 80 may be placed inside the tip structure formed using a filter containing encapsulated flavor.

In a general e-vaping device, flavoring additives may be stored in the liquid supply reservoir with the pre-vapor formulation. For some flavoring additives, the chemical and thermal environment in the pre-vapor formulation may reduce the stability of the flavoring additives. Also, some flavoring additives such as menthol may migrate to other portions in the e-vaping device and adsorb and/or absorb to other materials in the cartridge of a general e-vaping device. Additionally, the temperature of the pre-vapor formulation in the liquid supply reservoir may be raised when the vaporizer of a general e-vaping device is in operation if the heater and liquid supply reservoir are in close proximity to each other. When a level of the flavoring additive in the pre-vapor formulation of a general e-vaping device falls below a threshold level, an adult vaper's sensory experience may be affected during vaping.

However, in e-vaping devices according to some example embodiments such as the e-vaping devices 60a to 60h described above, the flavoring additive may be more stable if the flavoring additive is adsorbed onto the storage material 83 or absorbed in the storage material 83 compared to if the flavoring additive is stored in the liquid supply reservoir along with the pre-vapor formulation. Also, by encapsulating flavoring additives in a containment structure 81, the migration of the flavoring additive 81 to other portions of the first section 70 (e.g., outside of the porous plug 80) may be reduced. Thus, in some example embodiments, by using a porous plug 80 to store at least one flavoring additive separate from the pre-vapor formulation in a liquid supply reservoir, the shelf-life of the first section 70 may be improved and the migration of flavoring additives in the first section 70 may be reduced.

Although some example embodiments have been described above where the first section 70 and the second section 72 are separate structures that may be removably coupled to each other, one of ordinary skill in the art would understand that example embodiments are not limited thereto. For example, in other example embodiments, an e-vaping device may include a single unitary housing (e.g., tube) that includes several features (e.g., porous plug, vaporizer, liquid supply reservoir, power supply, puff sensor, etc.) arranged inside the unitary housing. For example, the single unitary housing may be provided instead of a separate housing 6 for the first section 70 and housing 22 for the second section 72. A tip structure may be connected to one end of the single unitary housing and may include the porous plug in the tip structure.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A cartridge comprising:
a housing including a first end opposite a second end;
a liquid supply reservoir in the housing and configured to store a pre-vapor formulation;
a vaporizer in the housing and in liquid communication with the liquid supply reservoir, the vaporizer being configured to generate a vapor from heating a portion of the pre-vapor formulation;
a mouth-end insert in the housing at the first end;
an inner gasket between the liquid supply reservoir and the mouth-end insert; and
a porous plug in the housing between the vaporizer and the mouth-end insert, the porous plug being permeable to the vapor, the porous plug between the vaporizer and the inner gasket.

2. The cartridge of claim 1, wherein
the porous plug encloses a flavoring additive contacting a storage material,
the flavoring additive configured to at least partially elute from the storage material or at least partially volatilize from the storage material if the vapor flows through the porous plug,
the flavoring additive includes one of menthol, limonene, benzaldehyde, or ethyl vanoline, and
the storage material includes one of a botanic material and a non-botanic material.

3. The cartridge of claim 2, wherein the flavoring additive includes menthol.

4. The cartridge of claim 2, wherein
the botanic material includes one of menthol crystal, mint leaves, tea leaves, coffee powder, dry flowers, lemon grass, orange peels, star anise, and clove, and the non-botanic material includes one of paper, cellulose, zerolite, cellulose acetate with acid, cellulose acetate without acid, and a polymer.

5. The cartridge of claim 2, wherein
a weight ratio of the flavoring additive to the storage material ranges from about 1:99 (flavoring additive: storage material) to 80:20 (flavoring additive: storage material).

6. The cartridge of claim 1, wherein
the porous plug is a bag containing a flavoring additive and a storage material, and
a material of the bag includes one of porous aluminum foil, perforated aluminum foil, nylon, filter paper, silk, plastic, and cellulose acetate.

7. The cartridge of claim 1, further comprising:
the pre-vapor formulation in the liquid supply reservoir, wherein
the pre-vapor formulation includes nicotine and at least one of glycerin (Gly) and propylene glycol, and
the porous plug encloses a flavoring additive contacting a storage material, the flavoring additive is configured to adsorb to the storage material or absorb in the storage material.

8. The cartridge of claim 1, wherein
a volume ratio of the liquid supply reservoir to the porous plug is in a range of about 10:90 (liquid supply volume: porous plug volume) to about 90:10 (liquid supply volume: porous plug volume).

9. The cartridge of claim 1, wherein
the porous plug is spaced apart from the vaporizer.

10. The cartridge of claim 1, wherein
the porous plug is adjacent to the vaporizer,
the porous plug is spaced apart from the first end.

11. A cartridge comprising:
a housing including first and second ends that are opposite each other and in fluid communication with each other through a channel;
a liquid supply reservoir in the housing and configured to store pre-vapor formulation;
a vaporizer in the housing and in liquid communication with the liquid supply reservoir, the vaporizer being configured to generate a vapor from the pre-vapor formulation;
a mouth-end insert in the housing at the first ends and
an inner gasket between the liquid supply reservoir and the mouth-end insert; and
a porous plug in the housing between the vaporizer and the mouth-end insert, the porous plug between the vaporizer and the inner gasket the porous plug being permeable to the vapor.

12. The cartridge of claim 11, wherein
the porous plug encloses a flavoring additive and at least one of a botanic material and a non-botanic material,
the botanic material includes one of menthol crystal, mint leaves, tea leaves, coffee powder, dry flowers, lemon grass, orange peels, star anise, and clove, and
the non-botanic material includes one of paper, cellulose, zerolite, cellulose acetate with acid, cellulose acetate without acid, and a polymer.

13. The cartridge of claim 11, wherein
the porous plug is a bag containing a flavoring additive and a storage material,
a material of the porous plug includes one of perforated aluminum foil, porous aluminum foil, nylon, filter paper, silk, plastic, and cellulose acetate, and
the flavoring additive is adsorbed onto the storage material or absorbed in the storage material.

14. An e-vaping device comprising:
a housing;
a liquid supply reservoir in the housing and configured to store a pre-vapor formulation;
a vaporizer in the housing and in liquid communication with the liquid supply reservoir, the vaporizer being configured to generate a vapor from heating a portion of the pre-vapor formulation;
a mouth-end insert in the housing at a first end of the housing;
an inner gasket be ween the liquid supply reservoir and the mouth-end insert; a porous plug in the housing between the vaporizer and the mouth-end insert,
the porous plug between vaporizer and the inner gasket
the porous plug being permeable to the vapor; and
a power supply configured to selectively supply power to the vaporizer.

15. The e-vaping device of claim 14, further comprising:
a cartridge; and
a battery section configured to be removably coupled to the cartridge, wherein
the cartridge includes the housing, the liquid supply reservoir, the vaporizer, the inner gasket, and the porous plug,
the battery section includes the power supply, and
the battery section is configured to provide power to the vaporizer if the battery section senses a negative pressure being applied to a first end of the cartridge.

* * * * *